US012694822B2

(12) United States Patent
Kim et al.

(10) Patent No.: US 12,694,822 B2
(45) Date of Patent: Jul. 28, 2026

(54) DISPLAY DEVICE, ELECTRONIC DEVICE AND DRIVING METHOD OF DISPLAY DEVICE THAT COMPENSATES FOR DEGRADATION DIFFERENCES OF PUBLIC AND PRIVATE LIGHT-EMITTING ELEMENTS

(71) Applicant: Samsung Display Co., Ltd., Yongin-Si (KR)

(72) Inventors: Jihye Kim, Yongin-si (KR); Sangan Kwon, Yongin-si (KR); Namjeong Kim, Yongin-si (KR); Jiyoun Kim, Yongin-si (KR); Haneul Kim, Yongin-si (KR); Hongsoo Kim, Yongin-si (KR); Changnoh Yoon, Yongin-si (KR); Sukhun Lee, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 19/085,154

(22) Filed: Mar. 20, 2025

(65) Prior Publication Data

US 2025/0391329 A1 Dec. 25, 2025

(30) Foreign Application Priority Data

Jun. 24, 2024 (KR) ........................ 10-2024-0082039

(51) Int. Cl.
*G09G 3/32* (2016.01)

(52) U.S. Cl.
CPC ....... *G09G 3/32* (2013.01); *G09G 2300/0465* (2013.01); *G09G 2310/08* (2013.01);
(Continued)

(58) Field of Classification Search
CPC ........................................................ G09G 3/32
See application file for complete search history.

(56) References Cited

U.S. PATENT DOCUMENTS

| | | | | |
|---|---|---|---|---|
| 11,982,894 B2 * | 5/2024 | Ling | ................ | G02F 1/133553 |
| 12,017,590 B2 * | 6/2024 | Kim | ...................... | B60K 35/28 |

(Continued)

FOREIGN PATENT DOCUMENTS

| | | |
|---|---|---|
| CN | 115776838 A | 3/2023 |
| KR | 1020220043832 A | 4/2022 |
| KR | 1020230036632 A | 3/2023 |

*Primary Examiner* — Chun-Nan Lin
(74) *Attorney, Agent, or Firm* — Innovation Counsel LLP

(57) ABSTRACT

Disclosed is a display device, which includes a display panel and a driving controller that provides a first selection signal and a second selection signal to the display panel. The display panel includes a pixel including a public light-emitting element that emits light when the first selection signal is in an active level and a privacy light-emitting element that emits light when the second selection signal is in an active level, and a light control pattern that overlaps the privacy light-emitting element on a plane. The driving controller calculates privacy stress data corresponding to the privacy light-emitting element based on public stress data corresponding to the public light-emitting element when the second selection signal is in the active level, performs a stress compensation for the image input signal based on the privacy stress data, and outputs the image data signal.

20 Claims, 26 Drawing Sheets

(52) U.S. Cl.
CPC . *G09G 2320/068* (2013.01); *G09G 2330/021* (2013.01); *G09G 2380/10* (2013.01)

(56) References Cited

U.S. PATENT DOCUMENTS

| | | | | |
|---|---|---|---|---|
| 12,200,976 | B2 * | 1/2025 | Yun | H10K 59/38 |
| 2022/0199694 | A1 * | 6/2022 | Bae | H10K 59/8792 |
| 2022/0306012 | A1 * | 9/2022 | Kim | B60K 35/22 |
| 2023/0016966 | A1 * | 1/2023 | Lee | H10K 59/38 |
| 2023/0099374 | A1 * | 3/2023 | Hong | B60K 35/654<br>257/91 |
| 2024/0069375 | A1 * | 2/2024 | Ling | G02F 1/133514 |
| 2024/0237399 | A1 * | 7/2024 | Kim | H10K 59/80521 |
| 2024/0260429 | A1 * | 8/2024 | Go | H10K 50/865 |

* cited by examiner

DISPLAY DEVICE, ELECTRONIC DEVICE AND DRIVING METHOD OF DISPLAY DEVICE THAT COMPENSATES FOR DEGRADATION DIFFERENCES OF PUBLIC AND PRIVATE LIGHT-EMITTING ELEMENTS

CROSS-REFERENCE TO RELATED APPLICATIONS

This application claims priority under 35 U.S.C. § 119 to Korean Patent Application No. 10-2024-0082039 filed on Jun. 24, 2024, in the Korean Intellectual Property Office, the disclosures of which are incorporated by reference herein in their entireties.

BACKGROUND

Embodiments of the present disclosure described herein relate to a display device and an electronic device including the same.

Display devices are becoming more diverse in their uses. In addition, the display devices are becoming thinner and lighter, and their range of use is expanding. Electronic devices may include display devices to provide visual information to users.

Recently, the display devices are installed in automobiles, which are one type of electronic devices. A user sitting in a driver's seat or a passenger seat may watch TV, movies, and other things in addition to various information provided by the display devices placed inside the automobiles.

SUMMARY

Embodiments of the present disclosure provide a display device capable of providing an image to a user but restricting viewing of the image from a specific direction, an electronic device including the same, and a method of driving the same.

According to an embodiment of the present disclosure, a display device includes a display panel and a driving controller that receives an image input signal, outputs an image data signal, and provides a first selection signal and a second selection signal to the display panel. The display panel includes a pixel including a public light-emitting element that emits light when the first selection signal is in an active level and a privacy light-emitting element that emits light when the second selection signal is in an active level, and a light control pattern that overlaps the privacy light-emitting element of the pixel on a plane. The driving controller calculates privacy stress data corresponding to the privacy light-emitting element based on public stress data corresponding to the public light-emitting element when the second selection signal is in the active level, performs a stress compensation for the image input signal based on the privacy stress data, and outputs the image data signal.

According to an embodiment, the driving controller may include a compensation control signal generator that receives a control signal and outputs the first selection signal and the second selection signal, an operation mode determiner that determines an operation mode based on the first selection signal and the second selection signal and outputs a mode signal, a public emission determiner that determines whether the image input signal corresponds to the privacy light-emitting element based on the first selection signal and the second selection signal and outputs a public emission signal, a stress data calculator that calculates stress data based on the image input signal and the public stress data in response to the mode signal and the public emission signal, and a compensator that performs the stress compensation for the image input signal based on the stress data and outputs the image data signal.

According to an embodiment, the driving controller may further include a memory that stores the public stress data, and the stress data calculator may calculate the stress data based on the public stress data stored in the memory and the image input signal.

According to an embodiment, the driving controller may calculate the privacy stress data based on a product of the public stress data and a stress index when the second selection signal is in the active level.

According to an embodiment, the stress index may be calculated based on an aperture ratio of the public light-emitting element and an aperture ratio of the privacy light-emitting element.

According to an embodiment, when the aperture ratio of the public light-emitting element is greater than the aperture ratio of the privacy light-emitting element, the stress index may have a value greater than "1".

According to an embodiment, the driving controller may calculate privacy stress data corresponding to the public light-emitting element based on the public stress data corresponding to the public light-emitting element when the first selection signal is in the active level, may perform the stress compensation for the image input signal based on the public stress data, and may output the image data signal.

According to an embodiment of the present disclosure, an electronic device includes a display panel including a pixel including a public light-emitting element and a privacy light-emitting element, and a driving controller that receives an image input signal, outputs an image data signal, and provides a first selection signal and a second selection signal to the display panel. The public light-emitting element has a first aperture ratio and emits light when the first selection signal is in an active level, and the privacy light-emitting element has a second aperture ratio different from the first aperture ratio and emits light when the second selection signal is in an active level. The driving controller calculates privacy stress data corresponding to the privacy light-emitting element based on a stress index corresponding to the first aperture ratio and the second aperture ratio, and public stress data corresponding to the public light-emitting element when the second selection signal is in the active level, performs a stress compensation for the image input signal based on the privacy stress data, and outputs the image data signal.

According to an embodiment, the driving controller may calculate the privacy stress data based on a product of the public stress data and the stress index when the second selection signal is in the active level.

According to an embodiment, the stress index may be calculated based on a ratio of the first aperture ratio and the second aperture ratio.

According to an embodiment, when the first aperture ratio is greater than the second aperture ratio, the stress index may have a value greater than "1".

According to an embodiment, the display panel may further include a light control pattern that overlaps the privacy light-emitting element on a plane.

According to an embodiment, the driving controller may include a compensation control signal generator that receives a control signal and outputs the first selection signal and the second selection signal, an operation mode determiner that determines an operation mode based on the first selection signal and the second selection signal and outputs a mode signal, a public emission determiner that determines whether the image input signal corresponds to the privacy light-emitting element based on the first selection signal and the second selection signal and outputs a public emission signal, a stress data calculator that calculates stress data based on the image input signal and the public stress data in response to the mode signal and the public emission signal, and a compensator that performs the stress compensation for the image input signal based on the stress data and outputs the image data signal.

According to an embodiment, the driving controller may further include a memory that stores the public stress data, and the stress data calculator may calculate the stress data based on the public stress data stored in the memory and the image input signal.

According to an embodiment, the driving controller may calculate privacy stress data corresponding to the public light-emitting element based on public stress data corresponding to the public light-emitting element when the first selection signal is in the active level, may perform the stress compensation for the image input signal based on the public stress data, and may output the image data signal.

According to an embodiment of the present disclosure, a method of driving a display device including a public light-emitting element and a privacy light-emitting element, includes determining whether the privacy light-emitting element emits light, calculating privacy stress data corresponding to the privacy light-emitting element based on public stress data corresponding to the public light-emitting element when the privacy light-emitting element emits light, performing a stress compensation for an image input signal based on the privacy stress data, and outputting an image data signal.

According to an embodiment, the public light-emitting element may have a first aperture ratio, the privacy light-emitting element may have a second aperture ratio different from the first aperture ratio, and the calculating of the privacy stress data may be based on a stress index corresponding to the first aperture ratio and the second aperture ratio and the public stress data corresponding to the public light-emitting element.

According to an embodiment, the stress index may be calculated based on a ratio of the first aperture ratio and the second aperture ratio.

According to an embodiment, when the first aperture ratio is greater than the second aperture ratio, the stress index may have a value greater than "1".

According to an embodiment, the method may further include calculating privacy stress data corresponding to the public light-emitting element based on public stress data corresponding to the public light-emitting element when the public light-emitting element emits light.

BRIEF DESCRIPTION OF THE FIGURES

The above and other features of the present disclosure will become apparent by describing in detail embodiments thereof with reference to the accompanying drawings.

DETAILED DESCRIPTION

Figure 1:
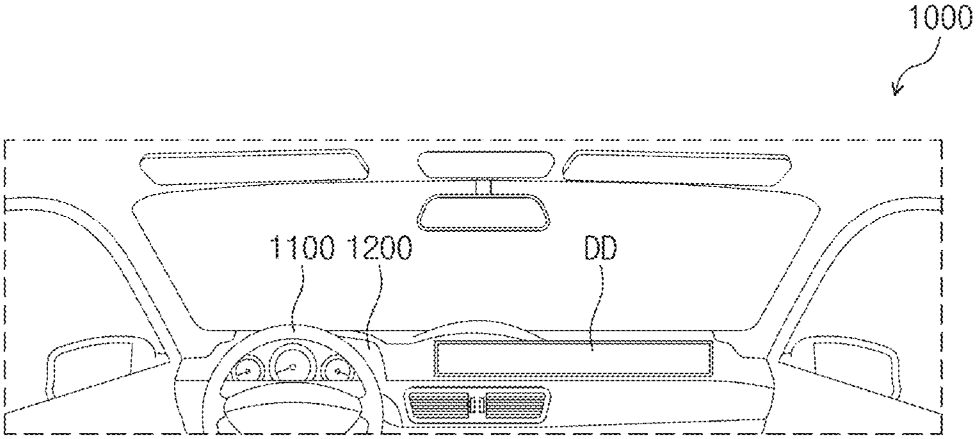
FIG. 1 is a diagram illustrating an interior of an automobile.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Also, the terms "under", "beneath", "on", "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the present disclosure.

Hereinafter, embodiments of the present disclosure will be described with reference to accompanying drawings.

FIG. 1 is a diagram illustrating an interior of an automobile 1000.

Referring to FIG. 1, the automobile 1000, which is one of electronic devices, may run on a road or a railway. The automobile 1000 may include a three-wheeled vehicle, a four-wheeled vehicle, a construction machine, a motorcycle, a bicycle, and a train running on a railway.

The automobile 1000 includes a display device DD, a steering wheel 1100, and a cluster 1200.

The display device DD is placed at a position corresponding to a dashboard of the automobile 1000 and may display an image. The steering wheel 1100 is a circular steering device used to change the direction of travel by moving the wheels of the automobile 1000 left and right. The cluster 1200 is an instrument panel for displaying the operating status of the automobile 1000, etc.

FIG. 1 illustrates an example in which the display device DD and the cluster 1200 are each implemented as independent devices, but the present disclosure is not limited thereto. In an embodiment, the display device DD and the cluster 1200 may be implemented as one display device.

The following description describes the circuit configuration and operation of the display device DD, but the present disclosure is not limited thereto. The present disclosure may also be applied when the display device DD and the cluster 1200 are implemented as one display device.

In addition, the present disclosure illustrates and describes the automobile 1000 as an example of an electronic device, but the present disclosure is not limited thereto. The present disclosure may be applied to various electronic devices equipped with the display device DD.

Figure 2A:
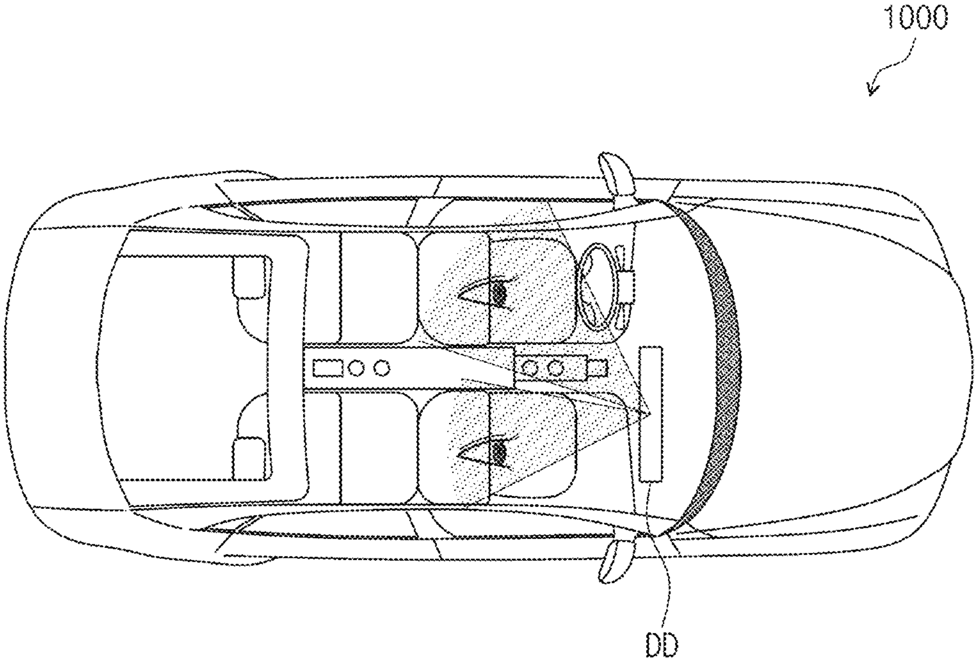
FIGS. 2A and 2B are diagrams illustratively showing viewing angles of a display device of an automobile.
Figure 2B:
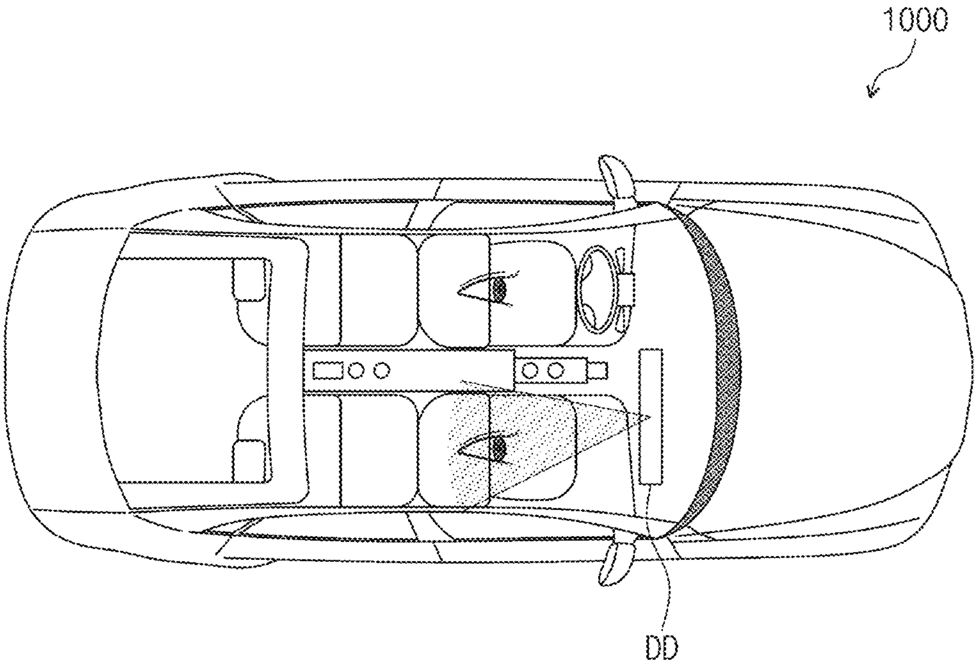

FIGS. 2A and 2B are diagrams illustratively showing viewing angles of the display device DD of the automobile 1000.

FIG. 2A illustrates an example of a viewing angle of the display device DD when the automobile 1000 is stopped. FIG. 2B illustrates an example of a viewing angle of the display device DD when the automobile 1000 is running.

Referring to FIG. 2A, when the automobile 1000 is stopped (i.e., not running), an image displayed on the display device DD may be viewed by both a user in a driver's seat and a user in a passenger seat.

Referring to FIG. 2B, when the automobile 1000 is running, an image displayed on the display device DD may not be viewed by the user in the driver's seat, but may only be viewed by the user in the passenger seat. This is to prevent an image displayed on the display device DD from distracting the driver while driving.

Figure 3:
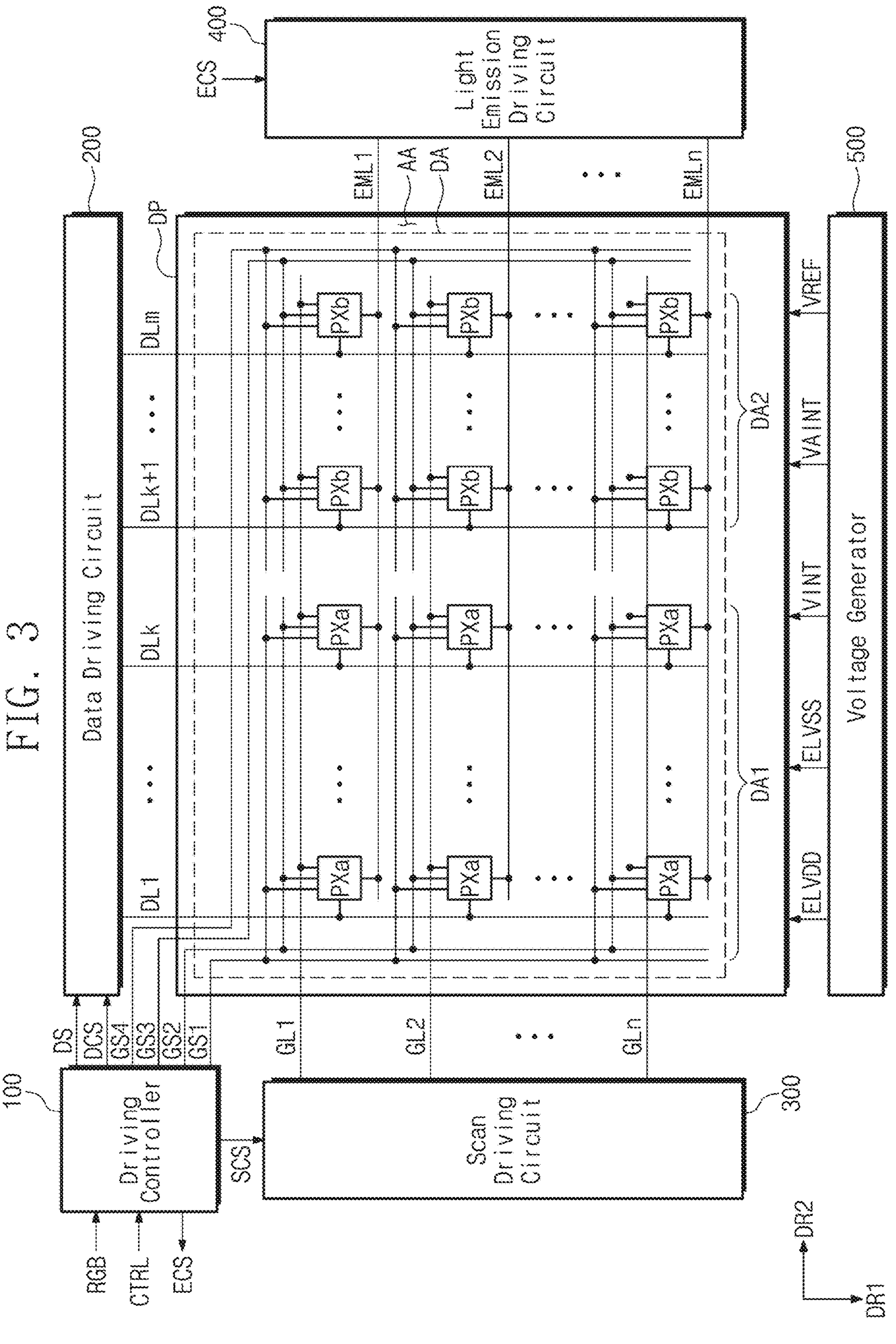
FIG. 3 is a block diagram of a display device, according to an embodiment of the present disclosure.

FIG. 3 is a block diagram of the display device DD, according to an embodiment of the present disclosure.

Referring to FIG. 3, the display device DD includes a display panel DP, a driving controller 100, a data driving circuit 200, a scan driving circuit 300, a light emission driving circuit 400, and a voltage generator 500.

The driving controller 100 receives an image input signal RGB and a control signal CTRL. The driving controller 100 generates an image data signal DS corresponding to the image input signal RGB. The driving controller 100 outputs a scan control signal SCS, a data control signal DCS, an emission control signal ECS, and first to fourth selection signals GS1, GS2, GS3, and GS4.

In an embodiment, the driving controller 100 outputs the first to fourth selection signals GS1, GS2, GS3, and GS4 corresponding to operation modes.

The scan driving circuit 300 receives the scan control signal SCS from the driving controller 100. The scan driving circuit 300 may output scan signals to scan lines GL1 to GLn in response to the scan control signal SCS.

The data driving circuit 200 receives the image data signal DS and the data control signal DCS from the driving controller 100. The data driving circuit 200 converts the image data signal DS into data signals and then outputs the data signals to a plurality of data lines DL1 to DLm to be described later. The data signals refer to analog voltages corresponding to a gray scale level of the image data signal DS.

The light emission driving circuit 400 receives the emission control signal ECS from the driving controller 100. The light emission driving circuit 400 outputs emission signals to light emission lines EML1 to EMLn in response to the emission control signal ECS.

The voltage generator 500 generates voltages necessary for an operation of the display panel DP. In an embodiment, the voltage generator 500 generates a first driving voltage ELVDD, a second driving voltage ELVSS, a first initialization voltage VINT, a second initialization voltage VAINT, and a reference voltage VREF. In an embodiment, the voltage generator 500 may operate under a control of the driving controller 100.

The display panel DP includes the data lines DL1 to DLm, the scan lines GL1 to GLn, the light emission lines EML1 to EMLn, the first to fourth selection lines GSL1, GSL2, GSL3, and GSL4, first pixels PXa, and second pixels PXb.

The display panel DP includes a display area DA and a peripheral area AA. In an embodiment, the first pixels PXa and the second pixels PXb may be disposed in the display area DA.

In an embodiment, the scan driving circuit 300 and the light emission driving circuit 400 may be disposed in the peripheral area AA of the display panel DP. In an embodiment, the scan driving circuit 300 and the light emission driving circuit 400 may include transistors formed through the same process as the plurality of first pixels PXa and the plurality of second pixels PXb.

The data lines DL1 to DLm extend from the data driving circuit 200 in a first direction DR1. Each of the scan lines GL1 to GLn extends from the scan driving circuit 300 in a second direction DR2. The light emission lines EML1 to EMLn extend from the light emission driving circuit 400 in the opposite direction of the second direction DR2.

The display area DA of the display panel DP includes a first display area DA1 and a second display area DA2. In an embodiment, the first pixels PXa may be disposed in the first display area DA1, and the second pixels PXb may be disposed in the second display area DA2.

Each of the plurality of first pixels PXa and the plurality of second pixels PXb is electrically connected to a corresponding one of the scan lines GL1 to GLn, a corresponding one of the data lines DL1 to DLm, and a corresponding one of the light emission lines EML1 to EMLn.

For example, as illustrated in FIG. 3, the first pixels PXa of a first row may be connected to the light emission line EML1 and the scan line GL1. The second pixels PXb of the first row may be connected to the light emission line EML1 and the scan line GL1. The first pixels PXa of the n-th row may be connected to the light emission line EMLn and the scan line GLn. The second pixels PXb of the n-th row may be connected to the light emission line EMLn and the scan line GLn.

Each of the plurality of first pixels PXa is connected to the first and second selection lines GSL1 and GSL2. Each of the plurality of second pixels PXb is connected to the third and fourth selection lines GSL3 and GSL4.

Each of the plurality of first pixels PXa may be connected to one of the data lines DL1 to DLk, and each of the plurality of second pixels PXb may be connected to one of the data lines DLk+1 to DLm.

Each of the plurality of first pixels PXa and the plurality of second pixels PXb receives the first driving voltage ELVDD, the second driving voltage ELVSS, the first initialization voltage VINT, the second initialization voltage VAINT, and the reference voltage VREF.

In FIG. 3, the scan driving circuit 300 and the light emission driving circuit 400 are illustrated and described as being implemented as independent circuits, but the present disclosure is not limited thereto. For example, the scan driving circuit 300 and the light emission driving circuit 400 may be configured as one circuit.

In an embodiment, the display panel DP may include a long side and a short side. The long side of the display panel DP extends in the second direction DR2, and the short side of the display panel DP extends in the first direction DR1.

In an embodiment, the light emission driving circuit 400 and the scan driving circuit 300 may be disposed adjacent to the short side of the display panel DP. In an embodiment, the data driving circuit 200 may be disposed adjacent to the long side of the display panel DP.

In FIG. 3, the first display area DA1 and the second display area DA2 are illustrated as being sequentially disposed along the long side of the display panel DP, i.e., the second direction DR2, but the present disclosure is not limited thereto.

Figure 4:
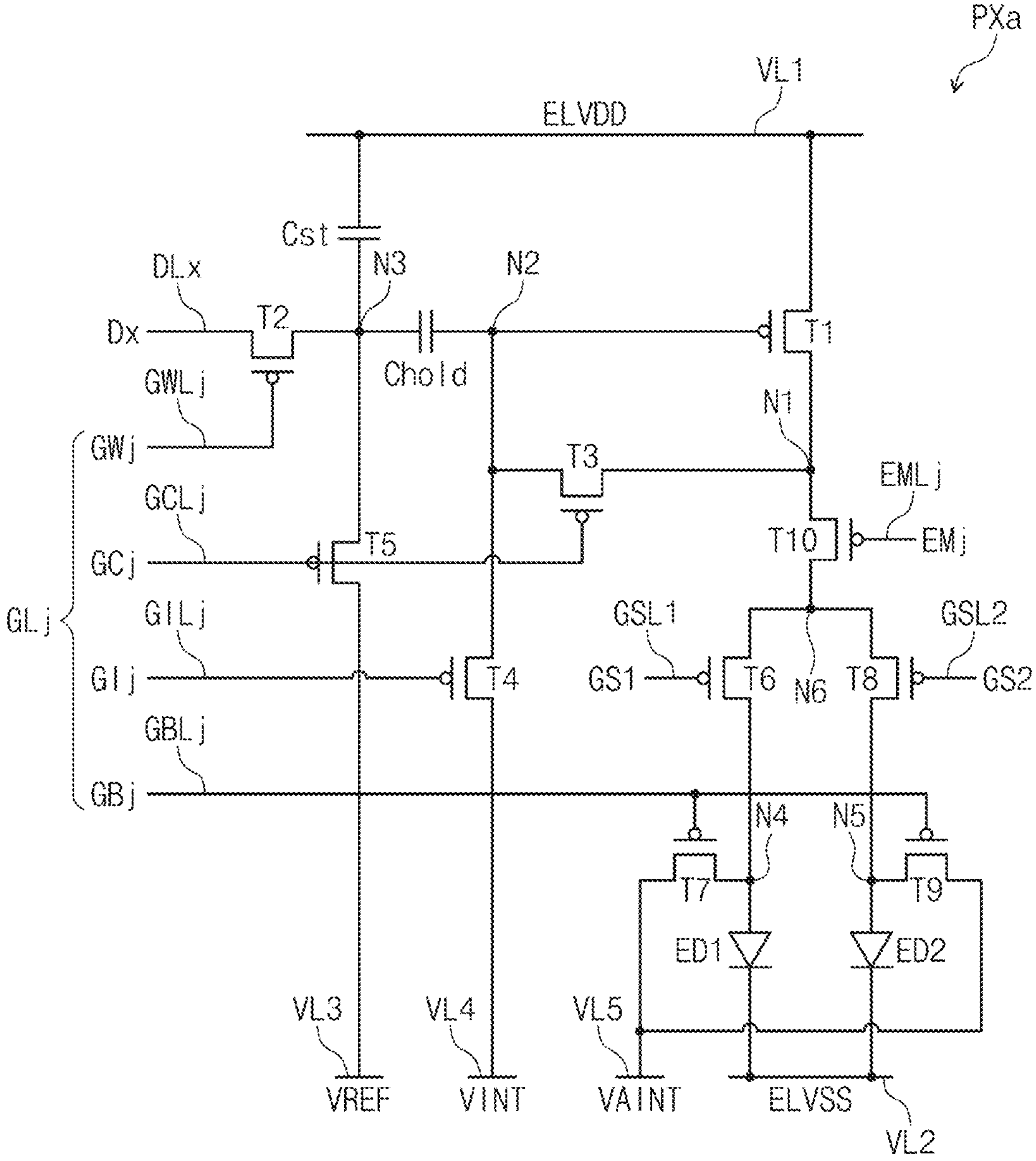
FIG. 4 is a circuit diagram of a first pixel, according to an embodiment of the present disclosure.

FIG. 4 is a circuit diagram of the first pixel PXa, according to an embodiment of the present disclosure.

FIG. 4 illustrates a circuit diagram of the first pixel PXa connected to the x-th data line DLx among the data lines DL1 to DLm, the j-th scan line GLj among the scan lines GL1 to GLn, the j-th light emission line EMLj among the light emission lines EML1 to EMLn, and the first and second selection lines GSL1 and GSL2, which are illustrated in FIG. 3.

In an embodiment, the j-th scan line GLj may include j-th scan lines GWLj, GCLj, GILj, and GBLj.

In an embodiment, the first pixel PXa includes first to tenth transistors T1 to T10, capacitors Cst and Chold, a public light-emitting element ED1, and a privacy light-emitting element ED2. In an embodiment, each of the first to tenth transistors T1 to T10 may be a P-type transistor having a low-temperature polycrystalline silicon (LTPS) semiconductor layer. In an embodiment, each of the first to tenth transistors T1 to T10 may be an N-type transistor using an oxide semiconductor as a semiconductor layer. In an embodiment, at least one of the first to tenth transistors T1 to T10 may be the N-type transistor and the others thereof may be the P-type transistors. The first pixel PXa illustrated in FIG. 4 is illustrated as including the first to tenth transistors T1 to T10, and the capacitors Cst and Chold as an example, but the present disclosure is not limited thereto. The number of pixels included in the first pixel PXa and their connection relationship, and the number of capacitors and their connection relationship may be variously changed. The first pixel PXa illustrated in FIG. 4 is only an example, and the circuit configuration of the first pixel PXa may be modified and implemented.

For convenience of description, in the following description, the x-th data line DLx, the j-th scan lines GWLj, GCLj, GILj, and GBLj, and the j-th light emission line EMLj are described as the data line DLx, the scan lines GWLj, GCLj, GILj, and GBLj, and the light emission line EMLj.

The scan lines GWLj, GCLj, GILj, and GBLj may transfer scan signals GWj, GCj, GIj, and GBj, respectively. The light emission line EMLj may transfer an emission signal EMj. The data line DLx may transfer a data signal Dx. The data signal Dx may have a voltage level corresponding to the image data signal DS (refer to FIG. 3) provided from the driving controller 100. First to fifth driving voltage lines VL1, VL2, VL3, VL4, and VL5 may transfer the first driving voltage ELVDD, the second driving voltage ELVSS, the reference voltage VREF, the first initialization voltage VINT, and the second initialization voltage VAINT, respectively.

The first transistor T1 is connected between the first driving voltage line VL1 and a first node N1, and includes a gate electrode connected to a second node N2.

The second transistor T2 is connected between the data line DLx and a third node N3, and includes a gate electrode connected to the scan line GWLj.

The third transistor T3 is connected between the first node N1 and the second node N2, and includes a gate electrode connected to the scan line GCLj.

The fourth transistor T4 is connected between the second node N2 and the fourth driving voltage line VLA, and includes a gate electrode connected to the scan line GILj.

The fifth transistor T5 is connected between the third node N3 and the third driving voltage line VL3, and includes a gate electrode connected to the scan line GCLj.

The sixth transistor T6 is connected between a sixth node N6 and a fourth node N4, and includes a gate electrode connected to the first selection line GSL1.

The seventh transistor T7 is connected between the fourth node N4 and the fifth driving voltage line VL5, and includes a gate electrode connected to the scan line GBLj.

The eighth transistor T8 is connected between the sixth node N6 and the fifth node N5, and includes a gate electrode connected to the second selection line GSL2.

The ninth transistor T9 is connected between the fifth node N5 and the fifth driving voltage line VL5, and includes a gate electrode connected to the scan line GBLj.

The tenth transistor T10 is connected between the first node N1 and the sixth node N6, and includes a gate electrode connected to the light emission line EMLj.

The capacitor Cst is connected between the first driving voltage line VL1 and the third node N3. The capacitor Chold is connected between the second node N2 and the third node N3.

The public light-emitting element ED1 includes an anode connected to the fourth node N4 and a cathode connected to the second driving voltage line VL2. The privacy light-emitting element ED2 includes an anode connected to the fifth node N5 and a cathode connected to the second driving voltage line VL2.

Figure 5:
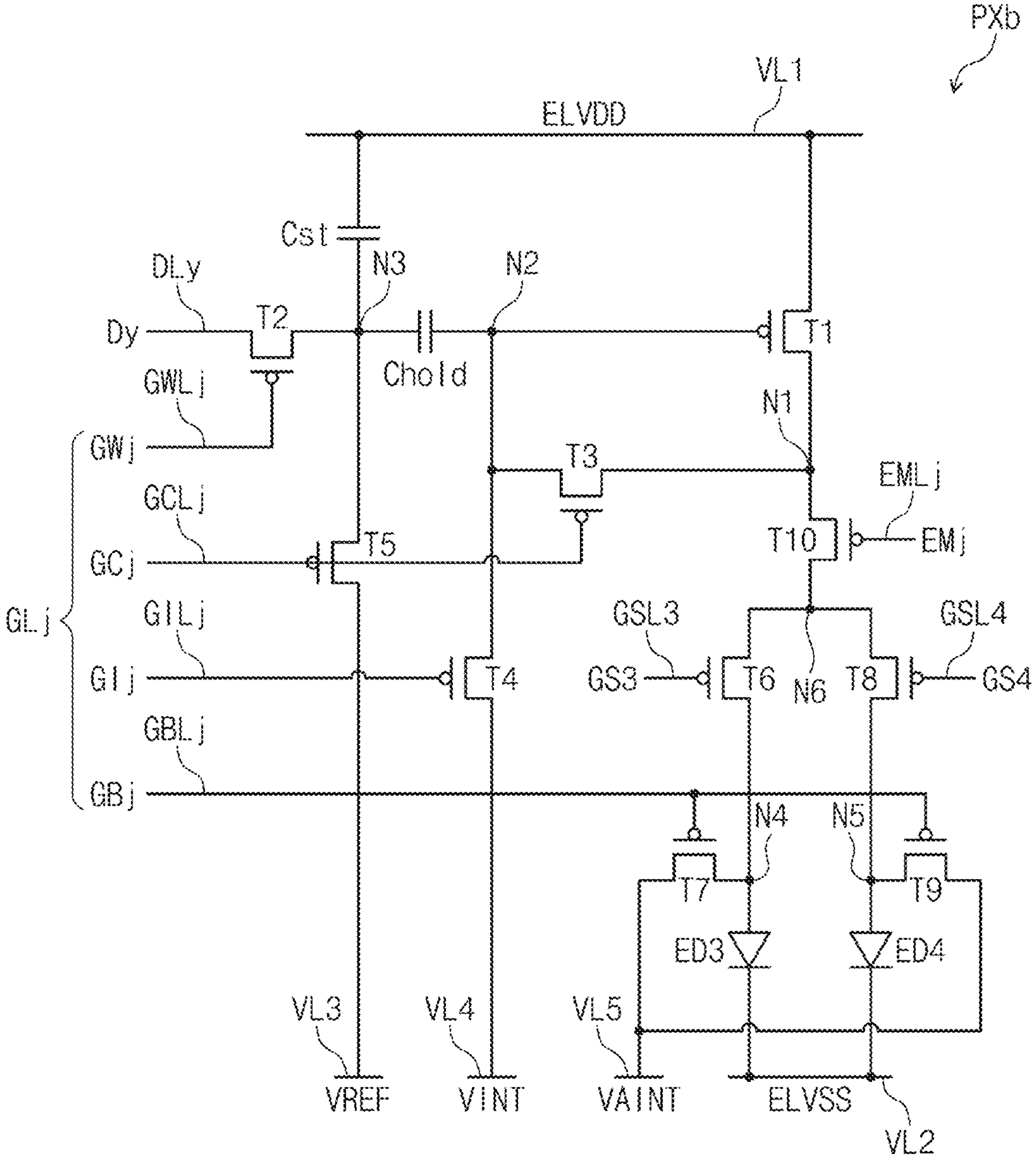
FIG. 5 is a circuit diagram of a second pixel, according to an embodiment of the present disclosure.

FIG. 5 is a circuit diagram of the second pixel PXb, according to an embodiment of the present disclosure.

FIG. 5 illustrates a circuit diagram of the second pixel PXb connected to a y-th data line DLy among the data lines DL1 to DLm, the j-th scan line GLj among the scan lines GL1 to GLn, the j-th light emission line EMLj among the light emission lines EML1 to EMLn, and the third and fourth selection lines GSL3 and GSL4, illustrated in FIG. 3.

Among the components of the second pixel PXb illustrated in FIG. 5, components similar to those of the first pixel PXa illustrated in FIG. 4 are indicated with the same reference numerals, and additional descriptions are omitted to avoid redundancy.

In an embodiment, the second pixel PXb includes the first to tenth transistors T1 to T10, the capacitors Cst and Chold, a public light-emitting element ED3, and a privacy light-emitting element ED4.

The second transistor T2 is connected between the data line DLy and the third node N3, and includes a gate electrode connected to the scan line GWLj. The data line DLy may transfer a data signal Dy.

The sixth transistor T6 is connected between the sixth node N6 and the fourth node N4, and includes a gate electrode connected to the third selection line GSL3.

The eighth transistor T8 is connected between the sixth node N6 and the fifth node N5, and includes a gate electrode connected to the fourth selection line GSL4.

The public light-emitting element ED3 includes an anode connected to the fourth node N4 and a cathode connected to the second driving voltage line VL2. The privacy light-emitting element ED4 includes an anode connected to the fifth node N5 and a cathode connected to the second driving voltage line VL2.

Figure 6A:
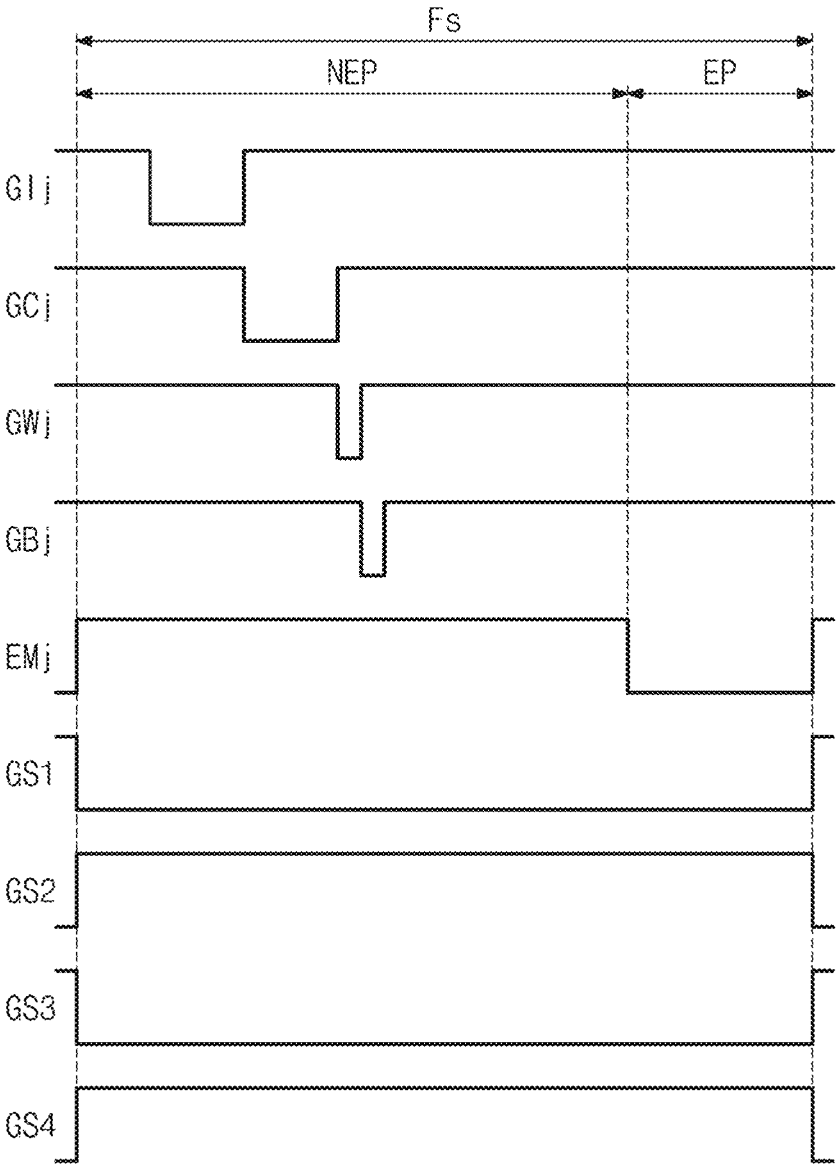
FIG. 6A is a timing diagram for describing an operation of a first pixel and a second pixel during a public mode.
Figure 6B:
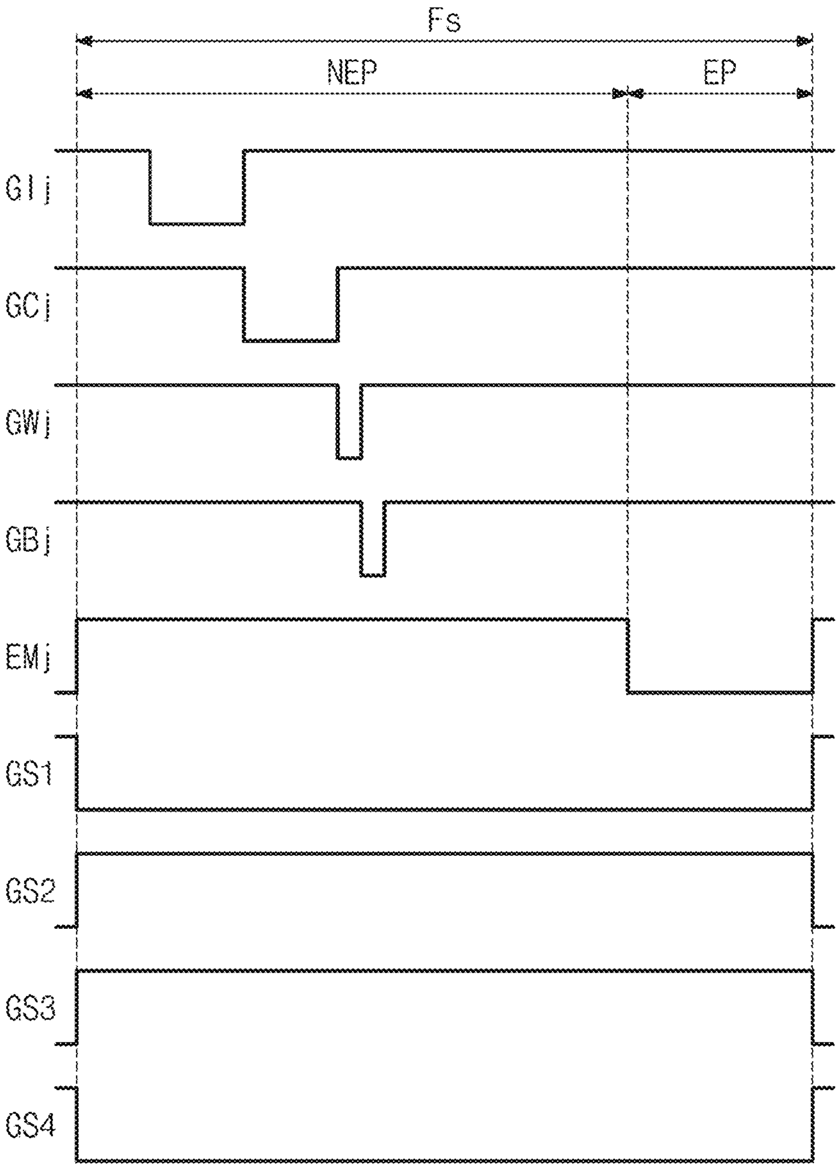
FIG. 6B is a timing diagram for describing an operation of a first pixel and a second pixel during a partial mode.
Figure 6C:
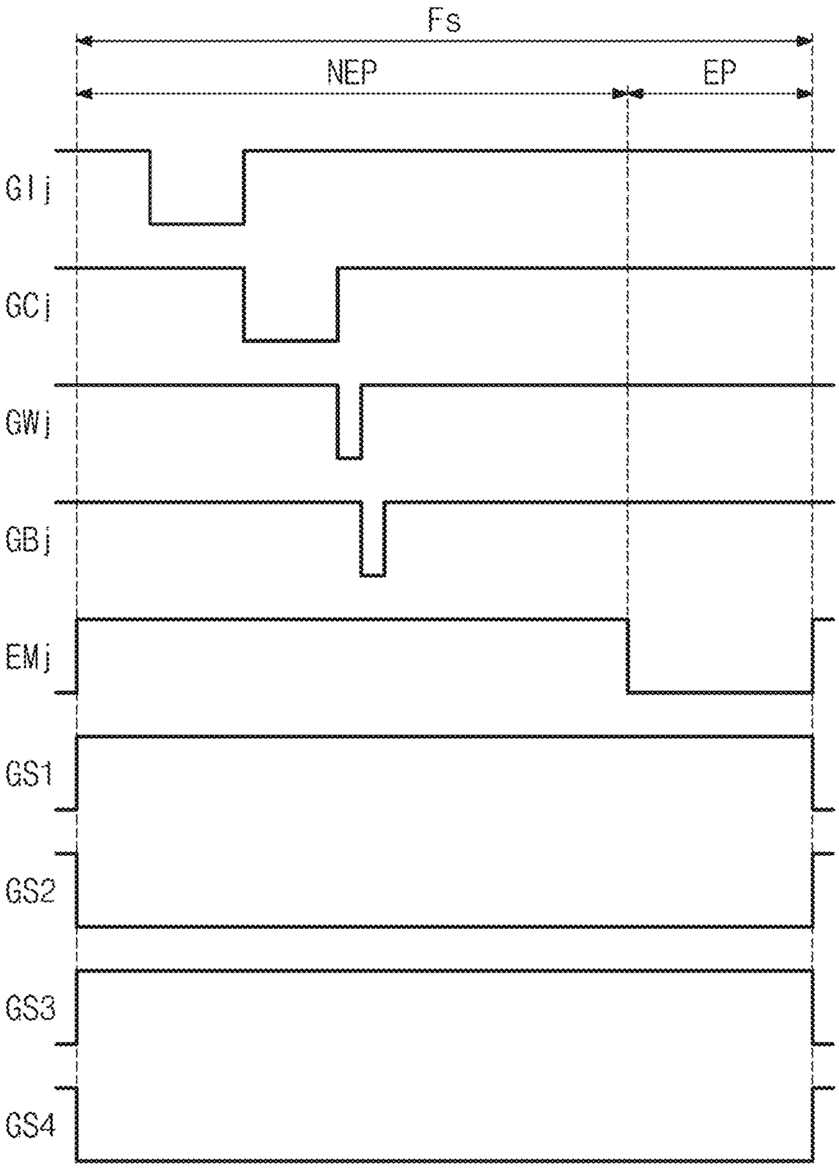
FIG. 6C is a timing diagram for describing an operation of a first pixel and a second pixel during a privacy mode.

FIG. 6A, FIG. 6B, and FIG. 6C are timing diagrams for describing operations of the first pixel PXa and the second pixel PXb.

FIG. 6A is a timing diagram for describing the operations of the first pixel PXa and the second pixel PXb during a public mode.

Referring to FIG. 4 and FIG. 6A, one frame Fs includes a non-emission period NEP and an emission period EP. The non-emission period NEP may be a period in which the scan signals GIj, GCj, GWj, and GBj are activated, and the emission period EP may be a period in which the emission signal EMj is activated. During the public mode (or a first mode), the first to fourth selection signals GS1, GS2, GS3, and GS4 are in low level, high level, low level, and high level, respectively. During the non-emission period NEP, the scan signal GIj of low level is first provided through the scan line GILj. When the fourth transistor T4 is turned on in response to the scan signal GIj of low level, the first initialization voltage VINT may be transferred to the gate electrode of the first transistor T1. The gate electrode of the first transistor T1 may be initialized with the first initialization voltage VINT.

Subsequently, the scan signal GCj of low level is provided through the scan line GCLj. When the fifth transistor T5 is turned on in response to the scan signal GCj of low level, the reference voltage VREF may be transferred to the third node N3. The third node N3 may be initialized with the reference voltage VREF.

The scan signal GWj of low level is provided through the scan line GWLj. When the second transistor T2 is turned on in response to the scan signal GWj of low level, the data signal Dx provided from the data line DLx may be transferred to the third node N3. In this case, the potential of the second node N2 may be changed by a voltage level of the data signal Dx by the capacitor Chold.

The seventh transistor T7 and the ninth transistor T9 are turned on by the scan signal GBj of low level provided through the scan line GBLj. Therefore, the anode of the public light-emitting element ED1 and the anode of the privacy light-emitting element ED2 may be initialized with the second initialization voltage VAINT, respectively.

Next, when the emission signal EMj of low level is provided from the light emission line EMLj during the emission period EP, the tenth transistor T10 is turned on. During the public mode, the first selection signal GS1 is in low level (i.e., an active level) and the second selection signal GS2 is in high level (i.e., an inactive level), so the sixth transistor T6 maintains a turn-on state and the eighth transistor T8 maintains a turn-off state. Therefore, current is supplied to the public light-emitting element ED1 through the first driving voltage line VL1, the first transistor T1, and the sixth transistor T6. The public light-emitting element ED1 supplied with current may emit light.

Referring to FIGS. 5 and 6A, during the frame Fs, the third selection signal GS3 is in low level and the fourth selection signal GS4 is in high level, so the sixth transistor T6 is turned on and the eighth transistor T8 is turned off. During the emission period EP, when the emission signal EMj of low level is provided from the light emission line EMLj, current is supplied to the public light-emitting element ED3 through the first driving voltage line VL1, the first transistor T1, and the sixth transistor T6. The public light-emitting element ED3 supplied with current may emit light.

In the examples illustrated in FIGS. 4, 5, and 6A, during the public mode, the public light-emitting element ED1 emits light corresponding to the data signal Dx, and the public light-emitting element ED3 emits light corresponding to the data signal Dy.

During the public mode, users located in the driver's seat and the passenger seat may view the image through the public light-emitting elements ED1 in the first pixels PXa of the first display area DA1 and the public light-emitting elements ED3 in the second pixels PXb of the second display area DA2.

FIG. 6B is a timing diagram for describing the operation of the first pixel PXa and the second pixel PXb during a partial mode.

A description of the operation of the first pixel PXa and the second pixel PXb during the partial mode (or a second mode) that overlaps with the operation of the public mode illustrated in FIG. 6A is omitted to avoid redundancy.

During the partial mode, the first to fourth selection signals GS1, GS2, GS3, and GS4 are in low level, high level, high level, and low level, respectively.

Referring to FIG. 4 and FIG. 6B, since the first selection signal GS1 is in low level and the second selection signal GS2 is in high level during the partial mode, the sixth transistor T6 maintains a turn-on state and the eighth transistor T8 maintains a turn-off state. Therefore, current is supplied to the public light-emitting element ED1 through the first driving voltage line VL1, the first transistor T1, and the sixth transistor T6. The public light-emitting element ED1 supplied with current may emit light.

Referring to FIG. 5 and FIG. 6B, during the frame Fs, the third selection signal GS3 is in high level and the fourth selection signal GS4 is in low level, so the sixth transistor T6 is turned off and the eighth transistor T8 is turned on. During the emission period EP, when the emission signal EMj of low level is provided from the light emission line EMLj, current is supplied to the privacy light-emitting element ED4 through the first driving voltage line VL1, the first transistor T1, and the eighth transistor T8. The privacy light-emitting element ED4 supplied with current may emit light.

In the examples illustrated in FIG. 4, FIG. 5, and FIG. 6B, during the partial mode, the public light-emitting element ED1 may emit light corresponding to the data signal Dx, and the privacy light-emitting element ED4 may emit light corresponding to the data signal Dy.

During the partial mode, a user located in the driver's seat may view an image through the public light-emitting elements ED1 in the first pixels PXa of the first display area DA1. During the partial mode, a user located in the passenger seat may view an image through the public light-emitting elements ED1 in the first pixels PXa of the first display area DA1 and the privacy light-emitting elements ED4 in the second pixels PXb of the second display area DA2.

FIG. 6C is a timing diagram for describing the operation of the first pixel PXa and the second pixel PXb during a privacy mode.

A description of the operation of the first pixel PXa and the second pixel PXb during the privacy mode (or a third mode) that overlaps with the operation of the public mode illustrated in FIG. 6A is omitted to avoid redundancy.

During the privacy mode, the first to fourth selection signals GS1, GS2, GS3, and GS4 are in high level, low level, high level, and low level, respectively.

Referring to FIG. 4 and FIG. 6C, during the privacy mode, the first selection signal GS1 is in high level and the second selection signal GS2 is in low level, so the sixth transistor T6 maintains a turn-off state and the eighth transistor T8 maintains a turn-on state. Therefore, current is supplied to the privacy light-emitting element ED2 through the first driving voltage line VL1, the first transistor T1, and the eighth transistor T8. The privacy light-emitting element ED2 supplied with current may emit light.

Referring to FIG. 5 and FIG. 6C, during the frame Fs, the third selection signal GS3 is in high level and the fourth selection signal GS4 is in low level, so the sixth transistor T6 is turned off and the eighth transistor T8 is turned on. During the emission period EP, when the emission signal EMj of low level is provided from the light emission line EMLj, current is supplied to the privacy light-emitting element ED4 through the first driving voltage line VL1, the first transistor T1, and the eighth transistor T8. The privacy light-emitting element ED4 supplied with current may emit light.

In the examples illustrated in FIG. 4, FIG. 5, and FIG. 6C, during the privacy mode, the privacy light-emitting element ED2 may emit light corresponding to the data signal Dx, and the privacy light-emitting element ED4 may emit light corresponding to the data signal Dy.

During the privacy mode, a user located in the driver's seat may view an image through the privacy light-emitting elements ED2 in the first pixels PXa of the first display area DA1. During the privacy mode, a user located in the passenger seat may view an image through the privacy light-emitting elements ED4 in the second pixels PXb of the second display area DA2.

Figure 7:
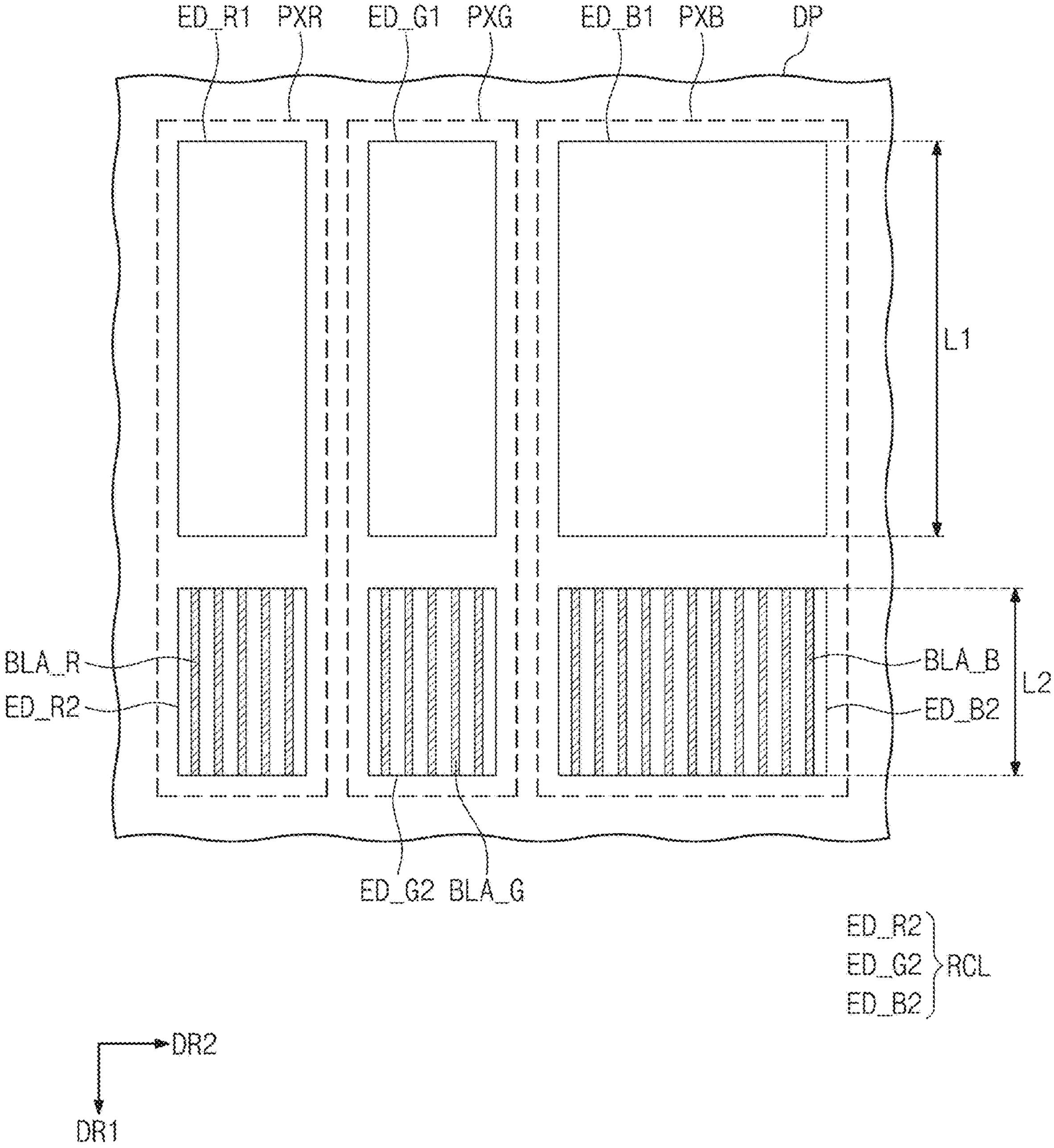
FIG. 7 is a diagram illustratively showing light-emitting elements arranged on a display panel.

FIG. 7 is a diagram illustratively showing light-emitting elements arranged on the display panel DP.

Referring to FIG. 7, the display panel DP includes a first color pixel PXR, a second color pixel PXG, and a third color pixel PXB. In an embodiment, each of the plurality of first pixels PXa and the plurality of second pixels PXb illustrated in FIG. 3 may correspond to one of the first color pixel PXR, the second color pixel PXG, and the third color pixel PXB.

In an embodiment, the first color pixel PXR may emit red light, the second color pixel PXG may emit green light, and the third color pixel PXB may emit blue light.

In an embodiment, each of the first color pixel PXR, the second color pixel PXG, and the third color pixel PXB may include the same circuit configuration as one of the first pixel PXa illustrated in FIG. 4 and the second pixel PXb illustrated in FIG. 5.

The first color pixel PXR includes a public light-emitting element ED_R1 and a privacy light-emitting element ED_R2. The second color pixel PXG includes a public light-emitting element ED_G1 and a privacy light-emitting element ED_G2. The third color pixel PXB includes a public light-emitting element ED_B1 and a privacy light-emitting element ED_B2.

In an embodiment, a light control layer RCL is disposed on top of the privacy light-emitting elements ED_R2, ED_G2, and ED_B2. The light control layer RCL may include light control patterns BLA_R, BLA_G, and BLA_B. Each of the light control patterns BLA_R, BLA_G, and BLA_B may include a plurality of patterns that extend in the first direction DR1 and are spaced apart from each other in the second direction DR2. The number of the plurality of patterns disposed in each of the light control patterns BLA_R, BLA_G, and BLA_B is not limited to the example illustrated in FIG. 7. For example, the number of the plurality of patterns disposed in each of the light control patterns BLA_R and BLA_G may be 2 or more, and the number of the plurality of patterns disposed in the light control pattern BLA_B may be 3 or more.

As described in FIG. 4, FIG. 5, and FIG. 6A, the public light-emitting elements ED_R1, ED_G1, and ED_B1 of the first pixel PXa and the public light-emitting elements ED_R1, ED_G1, and ED_B1 of the second pixel PXb may emit light during the public mode.

As described in FIGS. 4, 5, and 6B, the public light-emitting elements ED_R1, ED_G1, and ED_B1 of the first pixel PXa and the privacy light-emitting elements ED_R2, ED_G2, and ED_B2 of the second pixel PXb may emit light during the partial mode.

As described in FIGS. 4, 5, and 6C, the privacy light-emitting elements ED_R2, ED_G2, and ED_B2 of the first pixel PXa and the privacy light-emitting elements ED_R2, ED_G2, and ED_B2 of the second pixel PXb may emit light during the privacy mode.

In an embodiment, a first length L1 of the public light-emitting elements ED_R1, ED_G1, and ED_B1 in the first direction DR1 may be different from a second length L2 of the privacy light-emitting elements ED_R2, ED_G2, and ED_B2 in the first direction DR1. In the example illustrated in FIG. 7, the first length L1 is longer than the second length L2.

Although FIG. 7 illustrates that the length of each of the light control patterns BLA_R, BLA_G, and BLA_B in the first direction DR1 is the same as the second length L2 of each of the privacy light-emitting elements ED_R2, ED_G2, and ED_B2 in the first direction DR1, the present disclosure is not limited thereto. The length of each of the light control patterns BLA_R, BLA_G, and BLA_B in the first direction DR1 may be longer than the second length L2 of each of the privacy light-emitting elements ED_R2, ED_G2, and ED_B2 in the first direction DR1.

Although FIG. 7 illustrates that the display panel DP includes only the first color pixel PXR, the second color pixel PXG, and the third color pixel PXB corresponding to red, green, and blue, respectively, as a single pixel unit, the present disclosure is not limited thereto. The display panel DP may include color pixels corresponding to red, green, blue, and green. The display panel DP may include color pixels corresponding to red, green, blue, and white. The display panel DP may include color pixels corresponding to cyan, magenta, and yellow.

Figure 8:
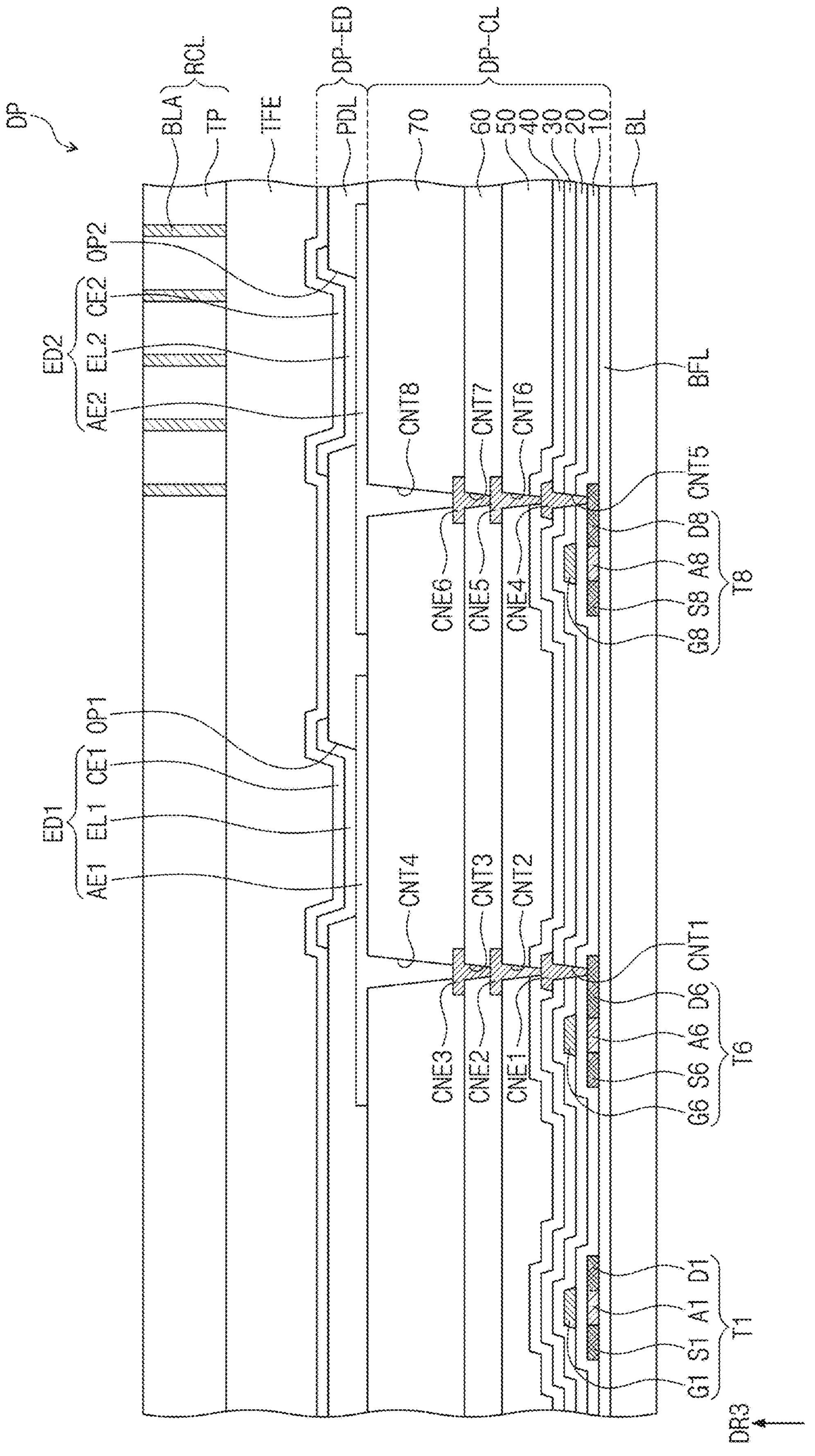
FIG. 8 is a diagram illustratively showing a cross-section of a portion of transistors, a public light-emitting element, and a privacy light-emitting element, which are within a first pixel of a display panel, according to an embodiment of the present disclosure.

FIG. 8 is a diagram illustratively showing a cross-section of a portion of the transistors T1, T6, and T8, the public light-emitting element ED1, and the privacy light-emitting element ED2, which are within the first pixel PXa of the display panel DP, according to an embodiment of the present disclosure.

In FIG. 8, only the first pixel PXa is illustrated, but the second pixel PXb may also include the same configurations as the first pixel PXa. However, the public light-emitting element ED3 and the privacy light-emitting element ED4 of the second pixel PXb may include the same configurations as the public light-emitting element ED1 and the privacy light-emitting element ED2 of the first pixel PXa.

Referring to FIG. 4 and FIG. 8, the display panel DP may include a base layer BL, a circuit element layer DP-CL, a display element layer DP-ED, a thin film encapsulation layer TFE, and the light control layer RCL. The display panel DP may further include functional layers such as a refractive index control layer. The circuit element layer DP-CL includes at least a plurality of insulating layers and circuit elements. Hereinafter, the insulating layers may include an organic layer and/or an inorganic layer.

An insulating layer, a semiconductor layer, and a conductive layer are formed through processes such as a coating process, a deposition process, and the like. Afterward, the insulating layer, the semiconductor layer, and the conductive layer may be selectively patterned through photolithography and etching processes. A semiconductor pattern, a conductive pattern, and a signal line are formed through the processes. Patterns disposed on the same layer are formed through the same process.

The base layer BL may include a synthetic resin film. The synthetic resin layer may include a thermosetting resin material. In particular, the synthetic resin layer may be a polyimide-based resin layer, and the material thereof is not specifically limited. The synthetic resin layer may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin. In addition, the base layer BL may include a glass substrate, a metal substrate, an organic/inorganic composite substrate, or the like.

At least one inorganic layer is formed on an upper surface of the base layer BL. The inorganic layer may include at least one of aluminum oxide, titanium oxide, silicon oxide, silicon oxynitride, zirconium oxide, and hafnium oxide. The inorganic layer may be formed of multiple layers. At least one of the multilayer inorganic layers may form a buffer layer BFL.

The buffer layer BFL improves a bonding force between the base layer BL and a semiconductor pattern and/or a conductive pattern. The buffer layer BFL may include a silicon oxide layer and a silicon nitride layer. The silicon oxide layer and the silicon nitride layer may be alternately stacked.

A semiconductor pattern is disposed on the buffer layer BFL. The semiconductor pattern may be placed directly on the buffer layer BFL. The semiconductor pattern may include a silicon semiconductor. The semiconductor pattern may include a low-temperature polycrystalline silicon (LTPS). However, the semiconductor pattern may include an amorphous silicon, but is not limited thereto. In an embodiment, when each of the first to ninth transistors T1 to T10 illustrated in FIG. 4 is an N-type transistor, the semiconductor pattern may include an oxide semiconductor.

An electrical property of the semiconductor pattern may be varied depending on whether the semiconductor pattern is doped. The semiconductor pattern may include a doped area and an undoped area. The doped area may be doped with an N-type dopant or a P-type dopant. A P-type transistor includes a doped area doped with a P-type dopant.

The doped area has higher conductivity than the undoped area, and actually operates as an electrode or a signal line. The undoped area actually corresponds to an active area (or a channel) of a transistor. In detail, a portion of the semiconductor pattern may be the active area of the transistor, another portion of the semiconductor pattern may be a first electrode (a source electrode) or a second electrode (a drain electrode) of the transistor, and still another portion of the semiconductor pattern may be a connection electrode or a connection signal line.

A first electrode S1, an active area A1, and a second electrode D1 of the first transistor T1 are formed from the semiconductor patterns. The first electrode S1 and the second electrode D1 of the first transistor T1 extend in opposite directions from the active area A1. Also a first electrode S6, an active area A6, and the second electrode D6 of the sixth transistor T6 are formed from the semiconductor patterns. A first electrode S8, an active area A8, and a second electrode D8 of the eighth transistor T8 may also be formed from the semiconductor patterns.

The first electrode S6 and the second electrode D6 of the sixth transistor T6 extend in opposite directions from the active area A6. The first electrode S6 of the sixth transistor T6 may be connected to the second electrode D1 of the first transistor T1. The second electrode D6 of the sixth transistor T6 may be electrically connected to an anode AE1 of the public light-emitting element ED1.

The first electrode S8 and the second electrode D8 of the eighth transistor T8 extend in opposite directions from the active area A8. The first electrode S8 of the eighth transistor T8 may be connected to the second electrode D1 of the first transistor T1. The second electrode D8 of the eighth transistor T8 may be electrically connected to an anode AE2 of the privacy light-emitting element ED2.

A first insulating layer 10 is disposed on the buffer layer BFL. The first insulating layer 10 covers the semiconductor pattern. The first insulating layer 10 may be an inorganic layer and/or an organic layer, and may have a single-layer structure or a multi-layer structure. The first insulating layer 10 may include at least one of aluminum oxide, titanium oxide, silicon oxide, silicon oxynitride, zirconium oxide, or hafnium oxide. In this embodiment, the first insulating layer 10 may be a silicon oxide layer having a single layer structure. An insulating layer of the circuit element layer DP-CL to be described later as well as the first insulating layer 10 may be an inorganic layer and/or an organic layer, and may have a single layer structure or a multi-layer structure. The inorganic layer may include at least one of the materials described above.

A gate electrode G1 of the first transistor T1 is disposed on the first insulating layer 10. The gate electrode G1 may be a part of a metal pattern. The gate electrode G1 of the first transistor T1 overlaps the active area A1 of the first transistor T1. The gate electrode G1 of the first transistor T1 may serve as a mask in the process of doping the semiconductor pattern.

A second insulating layer 20 covering the gate electrode G1 is disposed on the first insulating layer 10. The second insulating layer 20 may be an inorganic layer and/or an organic layer, and may have a single-layer structure or a multi-layer structure. According to an embodiment, the second insulating layer 20 may be a silicon oxide layer in a single layer structure.

A third insulating layer 30 is disposed on the second insulating layer 20. According to an embodiment, the third insulating layer 30 may be a silicon oxide layer in a single layer structure.

A first connection electrode CNE1 and a fourth connection electrode CNE4 may be disposed on the third insulating layer 30. The first connection electrode CNE1 may be connected to the second electrode D6 of the sixth transistor T6 through a contact hole CNT1 penetrating the first to third insulating layers 10 to 30. The fourth connection electrode CNE4 may be connected to the second electrode D8 of the eighth transistor T8 through a contact hole CNT5 penetrating the first to third insulating layers 10 to 30.

A fourth insulating layer 40 covering the first connection electrode CNE1 and the fourth connection electrode CNE4 may be disposed on the third insulating layer 30. The fourth insulating layer 40 may be a silicon oxide layer having a single-layer structure. A fifth insulating layer 50 is disposed on the fourth insulating layer 40. The fifth insulating layer 50 may be an organic layer. A second connection electrode CNE2 and a fifth connection electrode CNE5 may be disposed on the fifth insulating layer 50. The second connection electrode CNE2 may be connected to the first connection electrode CNE1 through a contact hole CNT2 penetrating the fourth insulating layer 40 and the fifth insulating layer 50. The fifth connection electrode CNE5 may be connected to the fourth connection electrode CNE4 through a contact hole CNT6 penetrating the fourth insulating layer 40 and the fifth insulating layer 50.

A sixth insulating layer 60 covering the second connection electrode CNE2 and the fifth connection electrode CNE5 is disposed on the fifth insulating layer 50. The sixth insulating layer 60 may be an organic layer. A third connection electrode CNE3 and a sixth connection electrode CNE6 may be disposed on the sixth insulating layer 60. The third connection electrode CNE3 may be connected to the second connection electrode CNE2 through a contact hole CNT3 penetrating the sixth insulating layer 60. The sixth connection electrode CNE6 may be connected to the fifth connection electrode CNE5 through a contact hole CNT7 penetrating the sixth insulating layer 60.

A seventh insulating layer 70 is disposed on the sixth insulating layer 60. The anode AE1 and the anode AE2 are disposed on the seventh insulating layer 70. The anode AE1 is connected to the third connection electrode CNE3 through a contact hole CNT4 penetrating the seventh insulating layer 70. The anode AE2 is connected to the sixth connection electrode CNE6 through a contact hole CNT8 penetrating the seventh insulating layer 70.

Openings OP1 and OP2 are defined in a pixel defining film PDL. The openings OP1 and OP2 of the pixel defining layer PDL expose at least a portion of each of the anodes AE1 and AE2.

A light-emitting layer EL1 is disposed on the anode AE1, and a light-emitting layer EL2 is disposed on the anode AE2. The light-emitting layer EL1 may be disposed only in an area corresponding to the opening OP1, and the light-emitting layer EL2 may be disposed only in an area corresponding to the opening OP2.

A cathode CE1 may be disposed on the light-emitting layer EL1, and a cathode CE2 may be disposed on the light-emitting layer EL2. The cathodes CE1 and CE2 may be disposed in the same layer.

The thin film encapsulation layer TFE is disposed on the cathodes CE1 and CE2. The thin film encapsulation layer TFE is disposed commonly in the pixels PX (refer to FIG. 3). In an embodiment, the thin film encapsulation layer TFE directly covers the cathodes CE1 and CE2. In an embodiment, a capping layer may be further disposed to directly cover the cathodes CE1 and CE2.

The thin film encapsulation layer TFE includes at least one inorganic layer or at least one organic layer. In an embodiment of the present disclosure, the thin film encapsulation layer TFE may include two inorganic layers and an organic layer disposed therebetween. In an embodiment of the present disclosure, the thin film encapsulation layer TFE may include a plurality of inorganic layers and a plurality of organic layers, which are alternately stacked.

The encapsulation inorganic layer protects the first and second privacy light-emitting elements ED1 and ED2 from moisture/oxygen, and the encapsulation organic layer protects the first and second privacy light-emitting elements ED1 and ED2 from foreign substances such as dust particles. The encapsulation inorganic layer may include a silicon nitride layer, a silicon oxynitride layer, a silicon oxide layer, a titanium oxide layer, or an aluminum oxide layer, but is not particularly limited thereto. The encapsulation organic layer may include an acryl-based organic layer and is not particularly limited thereto.

In an embodiment, the light control layer RCL includes the light control pattern BLA and a transmission pattern TP. The light control pattern BLA may be disposed on the thin film encapsulation layer TFE. The light control pattern BLA may include a plurality of patterns spaced apart from each other.

The light control pattern BLA may overlap with the privacy light-emitting element ED2. For example, when the display panel DP is a front-emitting type, the light control pattern BLA may be adjacent to each other in a third direction DR3 from the privacy light-emitting element ED2.

The light emitted by the privacy light-emitting element ED2 may be incident on the light control pattern BLA or may pass between the light control patterns BLA. The light incident on the light control pattern BLA may be reflected from the light control pattern BLA, may be transmitted through the light control pattern BLA, or may be absorbed to the light control pattern BLA.

In an embodiment, the light control pattern BLA may be formed by adopting a light absorbing material used in the relevant technical field without limitation. For example, a dark-colored pigment such as a black pigment or a gray pigment, a dark-colored dye, a metal such as aluminum or silver, a metal oxide, a dark-colored polymer, etc. may be used as the light-absorbing material.

The transmission pattern TP may include an optically transparent organic material. For example, the transmission pattern TP may include at least one of a polyimide-based resin, an acrylic-based resin, and a siloxane-based resin. However, this is an example, and the material forming the transmission pattern TP is not limited thereto. The transmission pattern TP may have an actually flat upper surface.

The light emitted by the privacy light-emitting element ED2 may be viewed by a user only when the light passes through the transmission pattern TP where the light control pattern BLA is not disposed. Therefore, the viewing angle of the display panel DP may be adjusted by adjusting the width and height of the light control pattern BLA and the distance between the patterns.

Figure 9A:
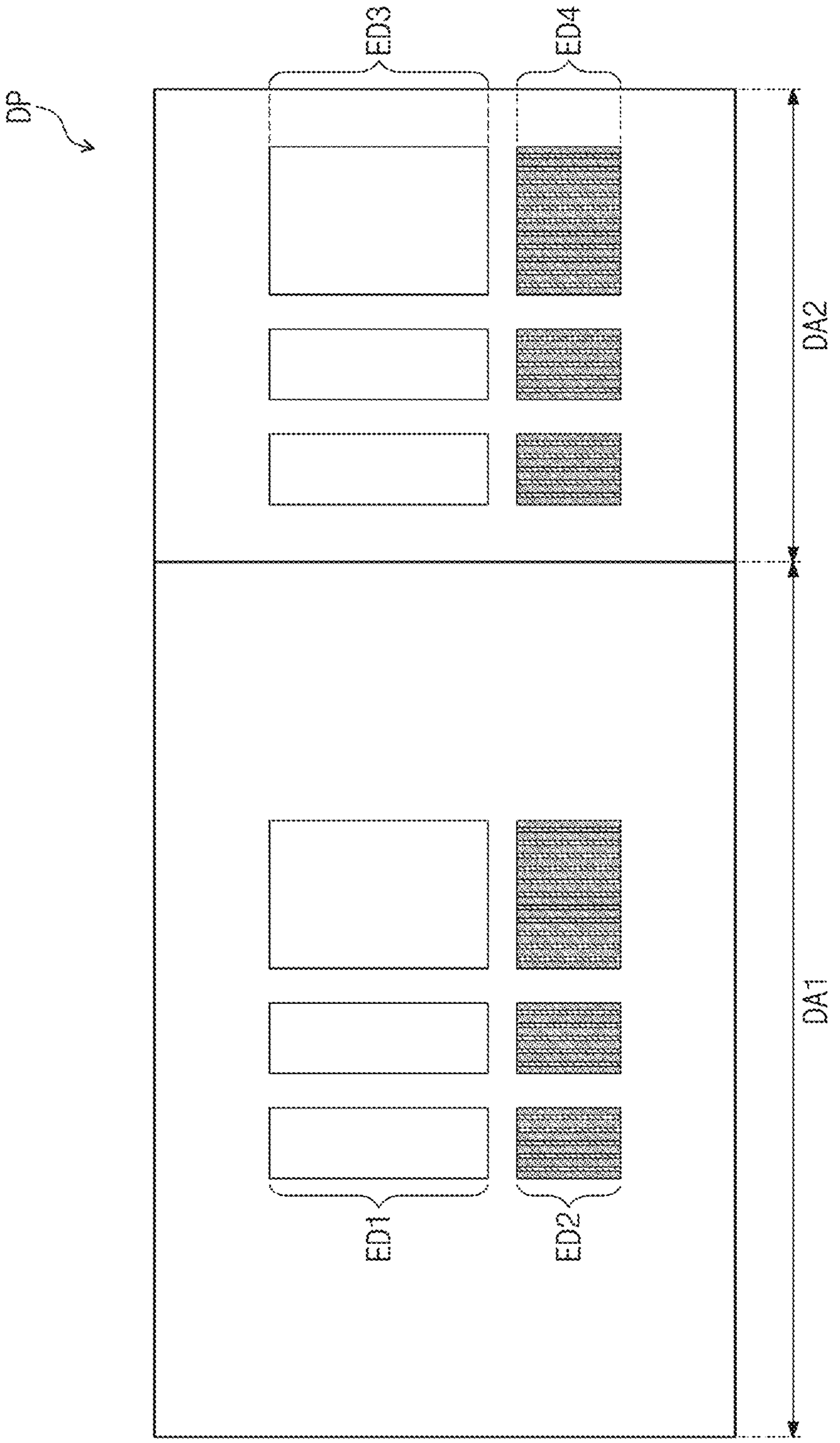
FIGS. 9A, 9B and 9C are diagrams illustratively showing light emission of public light-emitting elements and privacy light-emitting elements according to operation modes.
Figure 9B:
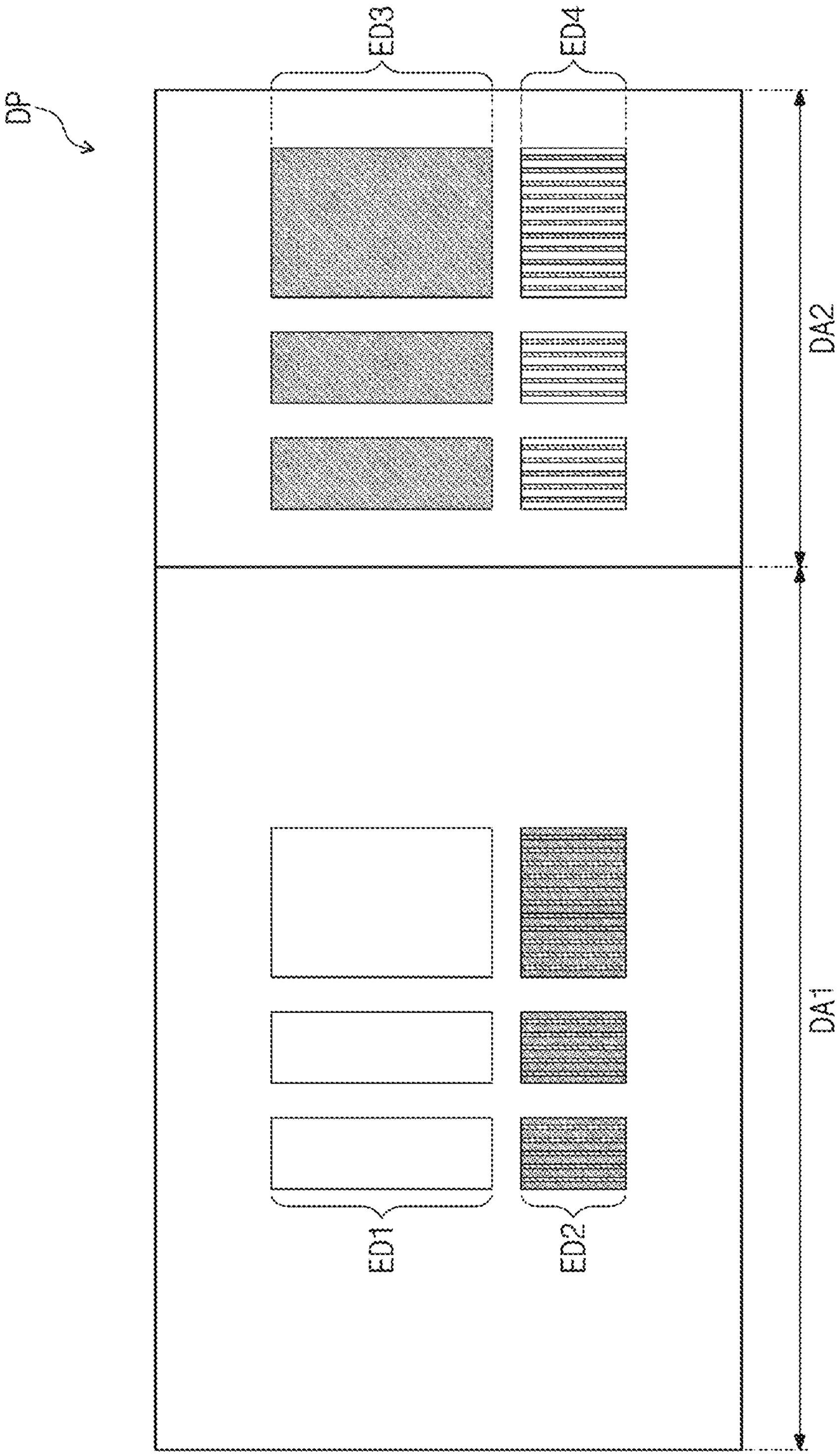
Figure 9C:
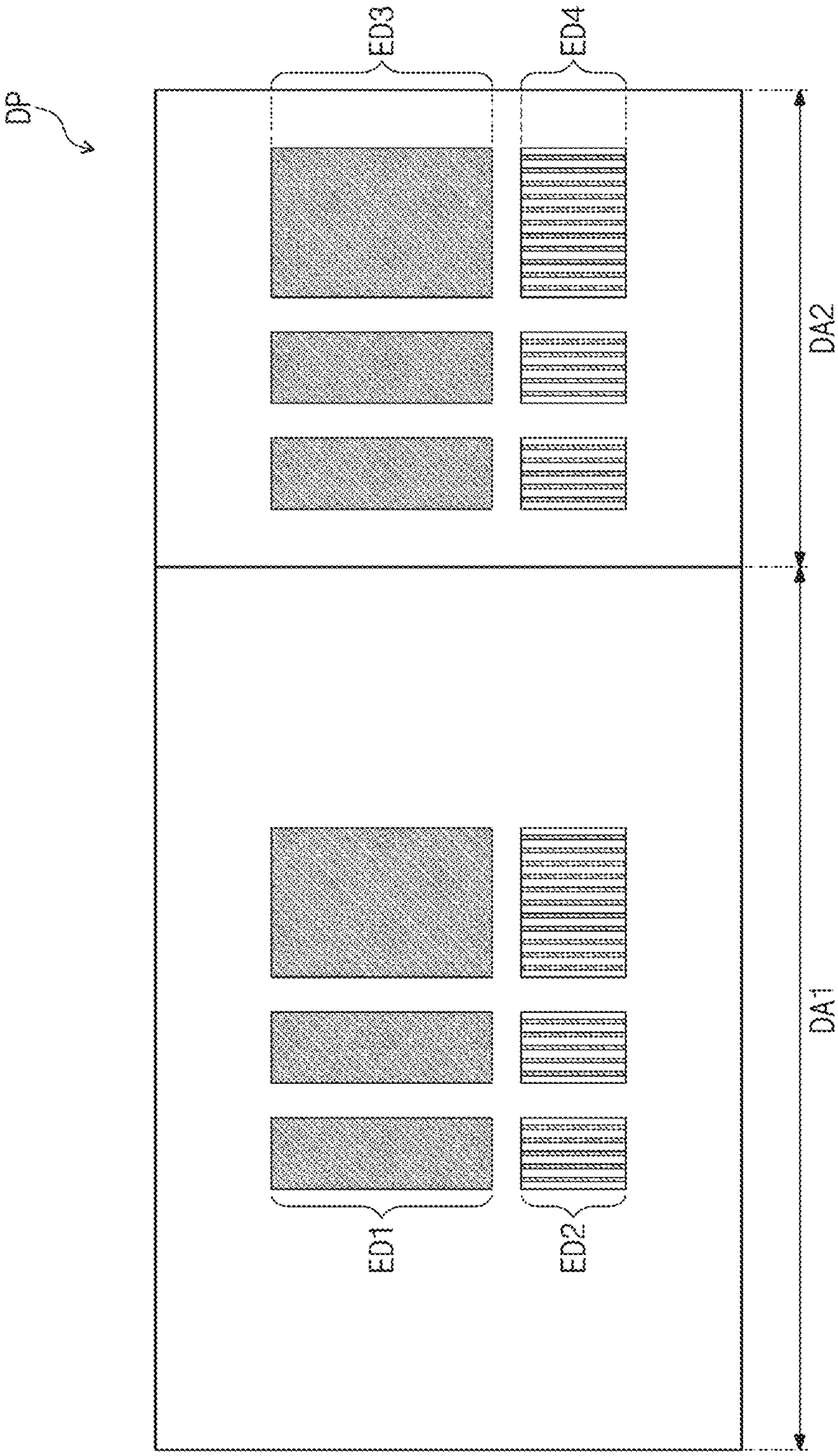

FIGS. 9A, 9B and 9C are diagrams illustratively showing light emission of public light-emitting elements and privacy light-emitting elements according to operation modes.

FIG. 9A illustrates an example of the light emission of the public light-emitting elements and the privacy light-emitting elements during the public mode.

Referring to FIG. 4, FIG. 5, and FIG. 9A, the public light-emitting elements ED1 in the first pixels PXa of the first display area DA1 and the public light-emitting elements ED3 in the second pixels PXb of the second display area DA2 emit light during the public mode. The privacy light-emitting elements ED2 in the first pixels PXa of the first display area DA1 and the privacy light-emitting elements ED4 in the second pixels PXb of the second display area DA2 do not emit light during the public mode.

FIG. 9B illustrates an example of the light emission of the public light-emitting elements and the privacy light-emitting elements during the partial mode.

Referring to FIG. 4, FIG. 5, and FIG. 9B, the public light-emitting elements ED1 in the first pixels PXa of the first display area DA1 and the privacy light-emitting elements ED4 in the second pixels PXb of the second display area DA2 emit light during the partial mode. The privacy light-emitting elements ED2 in the first pixels PXa of the first display area DA1 and the public light-emitting elements ED3 in the second pixels PXb of the second display area DA2 do not emit light during the partial mode.

FIG. 9C illustrates an example of the emission of the public light-emitting elements and the privacy light-emitting elements during the privacy mode.

Referring to FIG. 4, FIG. 5, and FIG. 9C, the privacy light-emitting elements ED2 in the first pixels PXa of the first display area DA1 and the privacy light-emitting elements ED4 in the second pixels PXb of the second display area DA2 emit light during the privacy mode. The public light-emitting elements ED1 in the first pixels PXa of the first display area DA1 and the public light-emitting elements ED3 in the second pixels PXb of the second display area DA2 do not emit light during the privacy mode.

Figure 10A:
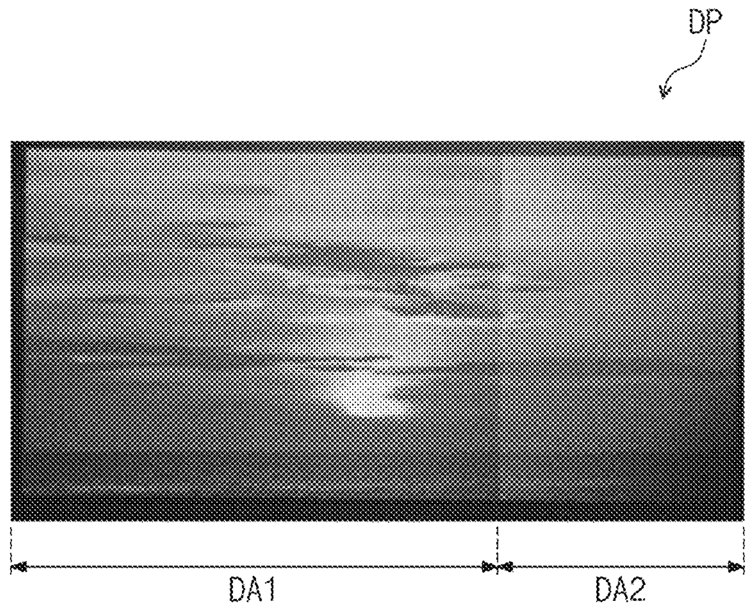
FIGS. 10A and 10B are diagrams illustratively showing an image displayed on a display panel during a partial mode.
Figure 10B:
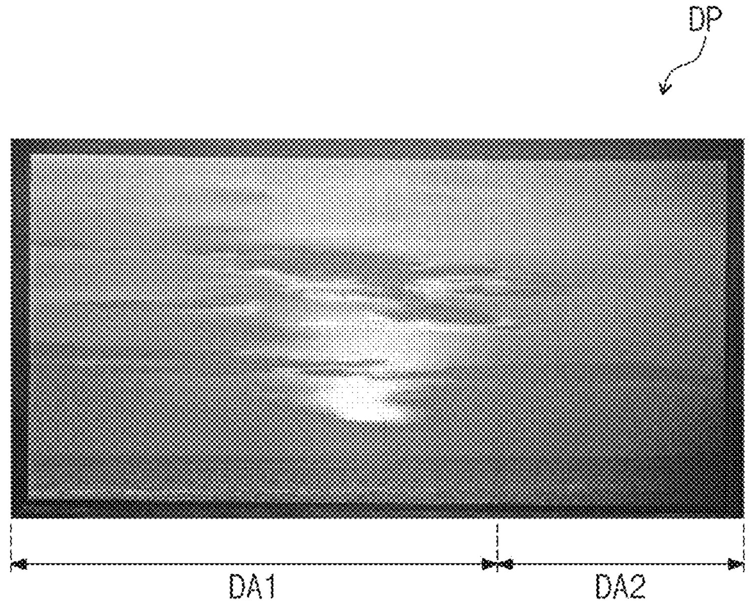

FIGS. 10A and 10B are diagrams illustratively showing an image displayed on the display panel DP during a partial mode.

Referring to FIG. 3, FIG. 4, FIG. 5, and FIG. 10A, the public light-emitting elements ED1 in the first pixels PXa of the first display area DA1 and the privacy light-emitting elements ED4 in the second pixels PXb of the second display area DA2 emit light during the partial mode.

As illustrated in FIG. 7, the first length L1 of the public light-emitting elements ED_R1, ED_G1, and ED_B1 in the first direction DR1 is longer than the second length L2 of the privacy light-emitting elements ED_R2, ED_G2, and ED_B2 in the first direction DR1. That is, the aperture ratio of each of the public light-emitting elements ED_R1, ED_G1, and ED_B1 of the first pixels PXa is greater than the aperture ratio of each of the privacy light-emitting elements ED_R2, ED_G2, and ED_B2 of the first pixels PXa. In addition, the aperture ratio of each of the public light-emitting elements ED_R1, ED_G1, and ED_B1 of the second pixels PXb is greater than the aperture ratio of each of the privacy light-emitting elements ED_R2, ED_G2, and ED_B2 of the second pixels PXb.

Therefore, even if the same current flows through the public light-emitting elements ED_R1, ED_G1, and ED_B1 and the privacy light-emitting elements ED_R2, ED_G2, and ED_B2, the brightness of the public light-emitting elements ED_R1, ED_G1, and ED_B1 may be different from the brightness of the privacy light-emitting elements ED_R2, ED_G2, and ED_B2.

When the display panel DP operates in the partial mode as illustrated in FIG. 10A, the brightness of the first display area DA1 may be perceived differently from the brightness of the second display area DA2.

Referring to FIGS. 3, 4, 5, and 10B, the driving controller 100 converts the image input signal RGB into the image data signal DS, and applies different gamma curves to the public light-emitting elements ED1 and ED3 and the privacy light-emitting elements ED2 and ED4.

The driving controller 100 converts the image input signal RGB into the image data signal DS based on a first gamma curve when the image input signal RGB corresponds to the public light-emitting elements ED1 and ED3.

The driving controller 100 converts the image input signal RGB into the image data signal DS based on a second gamma curve that is different from the first gamma curve when the image input signal RGB corresponds to the privacy light-emitting elements ED2 and ED4.

As illustrated in FIG. 7, when the first length L1 of the public light-emitting elements ED_R1, ED_G1, and ED_B1 in the first direction DR1 is longer than the second length L2 of the privacy light-emitting elements ED_R2, ED_G2, and ED_B2 in the first direction DR1, the second gamma curve may include values for increasing the brightness of the privacy light-emitting elements ED2 and ED4.

As a result, as illustrated in FIG. 10B, when the display panel DP operates in the partial mode, the brightness of the first display area DA1 and the brightness of the second display area DA2 may be perceived as being the same.

To increase the brightness of the privacy light-emitting elements ED2 and ED4, the amount of current provided to the privacy light-emitting elements ED2 and ED4 should increase. When a large amount of current continuously flows to the privacy light-emitting elements ED2 and ED4, the deterioration speed of the privacy light-emitting elements ED2 and ED4 may be faster than the deterioration speed of the public light-emitting elements ED1 and ED3.

In an embodiment of the present disclosure, the display device DD may perform deterioration compensation differently depending on the operation modes and the light-emitting elements that emit light. As a result, the brightness difference caused by the deterioration deviation of the public light-emitting elements ED1 and ED3 and the privacy light-emitting elements ED2 and ED4 may be minimized.

Figure 11:
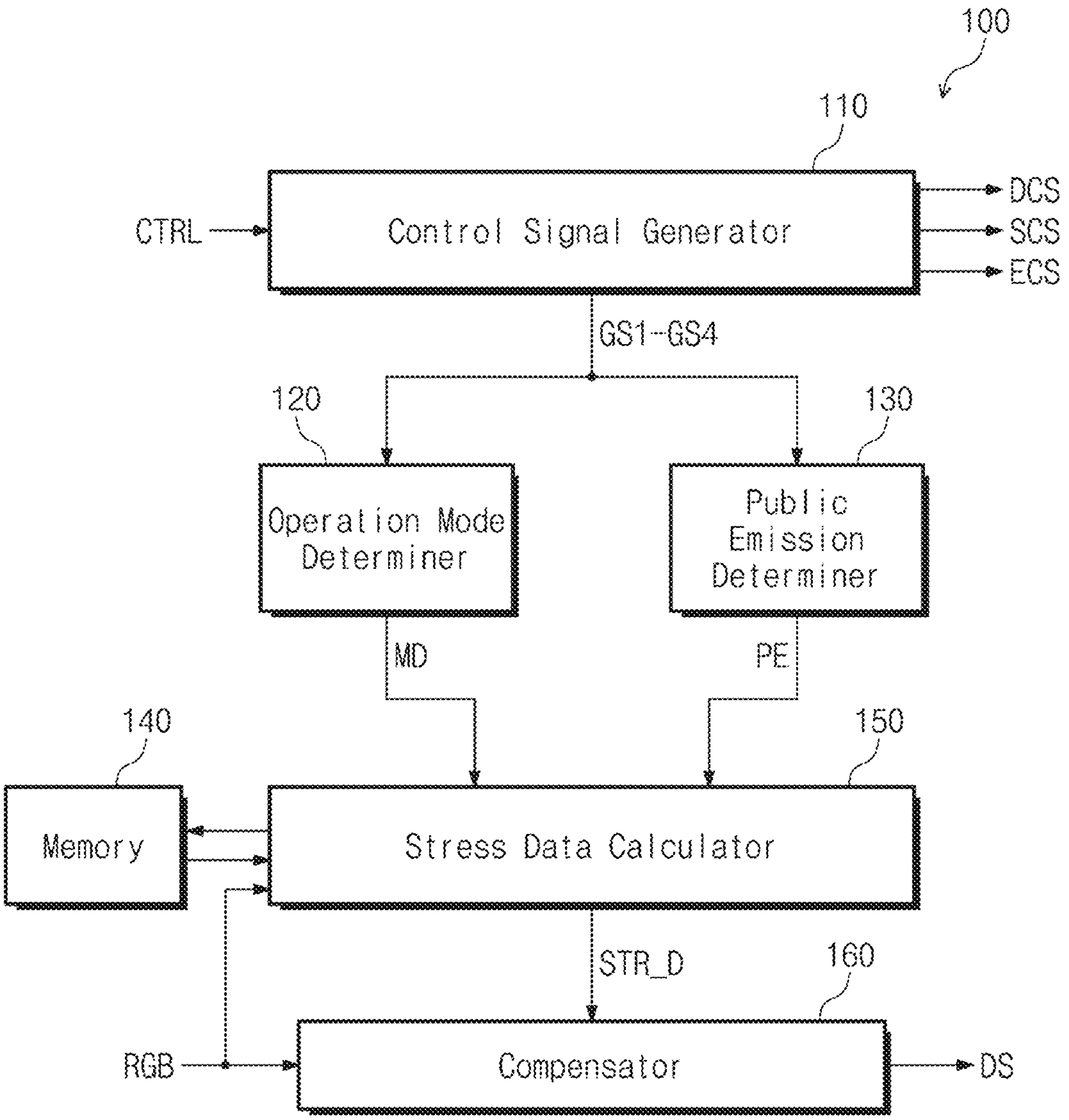
FIG. 11 is a block diagram of a driving controller, according to an embodiment of the present disclosure.

FIG. 11 is a block diagram of the driving controller 100, according to an embodiment of the present disclosure.

Figure 12:
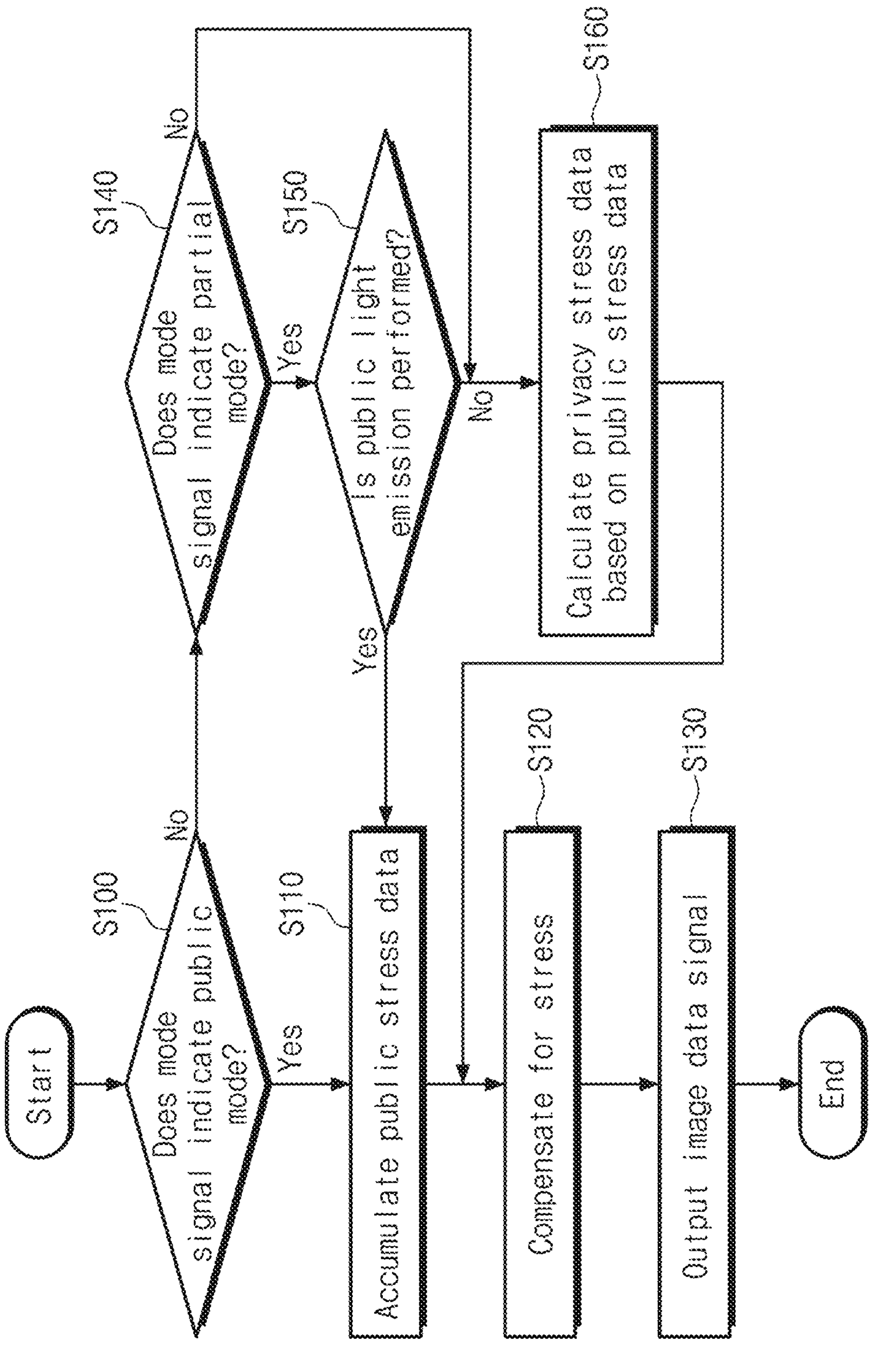
FIG. 12 is a flowchart for describing an operation of a driving controller, according to an embodiment of the present disclosure.

FIG. 12 is a flowchart for describing an operation of the driving controller 100, according to an embodiment of the present disclosure.

Referring to FIGS. 11 and 12, the driving controller 100 includes a control signal generator 110, an operation mode determiner 120, a public emission determiner 130, a memory 140, a stress data calculator 150, and a compensator 160. Although FIG. 11 illustrates that the driving controller 100 includes the memory 140, the present disclosure is not limited thereto. The memory 140 may be configured independently of the driving controller 100.

Each of the control signal generator 110, the operation mode determiner 120, the public emission determiner 130, the stress data calculator 150, and the compensator 160 may be a software program or a memory storing a software program.

The control signal generator 110 outputs the data control signal DCS, the scan control signal SCS, and the first to fourth selection signals GS1, GS2, GS3, and GS4 in response to the control signal CTRL. In an embodiment, the control signal generator 110 may determine an operation mode based on the control signal CTRL and may output the first to fourth selection signals GS1, GS2, GS3, and GS4.

The operation mode determiner 120 determines the operation mode based on the first to fourth selection signals GS1, GS2, GS3, and GS4. The operation mode determiner 120 may output a mode signal MD corresponding to the determined operation mode.

The public emission determiner 130 determines whether at least one of the public light-emitting elements ED1 and ED3 emits light based on the first to fourth selection signals GS1, GS2, GS3, and GS4. In detail, the public emission determiner 130 may determine whether the image input signal RGB of a current frame corresponds to at least one of the public light-emitting elements ED1 and ED3 based on the first to fourth selection signals GS1, GS2, GS3, and GS4. When at least one of the public light-emitting elements ED1 and ED3 emits light, the public emission determiner 130 outputs a public emission signal PE as an active level. When all of the public light-emitting elements ED1 and ED3 do not emit light, the public emission determiner 130 outputs the public emission signal PE as an inactive level.

When the mode signal MD indicates the public mode (operation S100), the stress data calculator 150 accumulates stress data for the public light-emitting elements ED1 and ED3, i.e., public stress data. As illustrated in FIG. 9A, during the public mode, the public light-emitting elements ED1 in the first pixels PXa of the first display area DA1 and the public light-emitting elements ED3 in the second pixels PXb of the second display area DA2 emit light.

The stress data calculator 150 may calculate the public stress data by adding the public stress data accumulated up to the previous frame stored in the memory 140 and the image input signal RGB (operation S110). The stress data calculator 150 stores the public stress data in the memory and provides the public stress data as stress data STR_D to the compensator 160.

The compensator 160 performs stress compensation for the image input signal RGB based on the stress data STR_D (operation S120).

The compensator 160 outputs a stress-compensated image data signal DS (operation S130).

When the mode signal MD does not indicate the public mode, the stress data calculator 150 determines whether the mode signal MD indicates the partial mode (operation S140).

When the mode signal MD indicates the partial mode, the stress data calculator 150 determines whether the public emission signal PE is in the active level. In detail, the stress data calculator 150 determines whether at least one of the public light-emitting elements ED1 and ED3 emits light (operation S150).

When the image input signal RGB corresponds to one of the public light-emitting elements ED1 and ED3, the stress data calculator 150 accumulates stress data for the public light-emitting elements ED1 and ED3, i.e., public stress data (operation S110). In the example illustrated in FIG. 9B, the public light-emitting elements ED1 in the first pixels PXa of the first display area DA1 emit light during the partial mode.

The stress data calculator 150 may calculate the public stress data by adding the public stress data accumulated up to the previous frame stored in the memory 140 and the image input signal RGB (operation S110). The stress data calculator 150 stores the public stress data in the memory and provides the public stress data as the stress data STR_D to the compensator 160.

The compensator 160 performs stress compensation for the image input signal RGB based on the stress data STR_D (operation S120).

When the image input signal RGB does not correspond to any one of the public light-emitting elements ED1 and ED3, the stress data calculator 150 calculates stress data for the privacy light-emitting elements ED2 and ED4, i.e., privacy stress data (operation S160). In the example illustrated in FIG. 9B, the privacy light-emitting element ED4 in the second pixels PXb of the second display area DA2 emits light during the partial mode.

The stress data calculator 150 may calculate the privacy stress data by adding the public stress data accumulated up to the previous frame stored in the memory 140 and the image input signal RGB (operation S160). The stress data calculator 150 provides the privacy stress data as the stress data STR_D to the compensator 160.

As illustrated in FIG. 7, the display panel DP includes the first color pixel PXR, the second color pixel PXG, and the third color pixel PXB. The degradation characteristics of each of the first color pixel PXR, the second color pixel PXG, and the third color pixel PXB may be different from each other. In addition, the operation time and stress level of each of the first color pixel PXR, the second color pixel PXG, and the third color pixel PXB may be different depending on an operating environment. Therefore, the privacy stress data for each of the first color pixel PXR, the second color pixel PXG, and the third color pixel PXB should be calculated. The following Equations 1, 2, and 3 indicate formulas by which the stress data calculator 150 calculates the privacy stress data for each of the privacy light-emitting element ED_R2 in the first color pixel PXR, the privacy light-emitting element ED_G2 in the second color pixel PXG and the privacy light-emitting element ED_B2 in the third color pixel PXB.

$$PRI\_STR\_R = PUB\_STR\_R \times SI\_R \quad \text{[Equation 1]}$$

Privacy stress data PRI_STR_R for the privacy light-emitting element ED_R2 may be calculated by a product of public stress data PUB_STR_R for the public light-emitting element ED_R1 and a stress index SI_R.

$$PRI\_STR\_G = PUB\_STR\_G \times SI\_G \quad \text{[Equation 2]}$$

Privacy stress data PRI_STR_G for the privacy light-emitting element ED_G2 may be calculated by a product of public stress data PUB_STR_G for the public light-emitting element ED_G1 and a stress index SI_G.

$$PRI\_STR\_B = PUB\_STR\_B \times SI\_B \quad \text{[Equation 3]}$$

Privacy stress data PRI_STR_B for the privacy light-emitting element ED_B2 may be calculated by a product of public stress data PUB_STR_B for the public light-emitting element ED_B1 and a stress index SI_B.

In an embodiment, the stress indices SI_R, SI_G, and SI_B may be calculated based on the aperture ratios of the public light-emitting elements ED_R1, ED_G1, and ED_B1 and the privacy light-emitting elements ED_R2, ED_G2, and ED_B2.

The following Table 1 illustrates the stress indices SI_R, SI_G, and SI_B corresponding to the aperture ratios of the public light-emitting elements ED_R1, ED_G1, and ED_B1 and the privacy light-emitting elements ED_R2, ED_G2, and ED_B2.

TABLE 1

| | PXR | PXG | PXB |
|---|---|---|---|
| Public light-emitting element | 9.3% | 9.3% | 50.0% |
| Privacy light-emitting element | 3.5% | 3.5% | 11.5% |
| Stress Index | 2.7 | 2.7 | 4.3 |

The stress index SI_R is obtained by the ratio of the public light-emitting element ED_R1 to the privacy light-emitting element ED_R2, which is 9.3/3.5=2.7.

The stress index SI_G is obtained by the ratio of the public light-emitting element ED_G1 to the privacy light-emitting element ED_G2, which is 9.3/3.5=2.7.

The stress index SI_B is obtained by the ratio of the public light-emitting element ED_B1 to the privacy light-emitting element ED_B2, which is 50.0/11.5=4.3.

In an embodiment, when the aperture ratio of each of the public light-emitting elements ED_R1, ED_G1, and ED_B1 is greater than the aperture ratio of each of the privacy light-emitting elements ED_R2, ED_G2, and ED_B2, each of the stress indices SI_R, SI_G, and SI_B has a value greater than "1".

In this way, the stress data calculator 150 provides the privacy stress data PRI_STR_R, PRI_STR_G, and PRI_S-TR_B for each of the privacy light-emitting element ED_R2 in the first color pixel PXR, the privacy light-emitting element ED_G2 in the second color pixel PXG, and the privacy light-emitting element ED_B2 in the third color pixel PXB as the stress data STR_D to the compensator 160.

The stress data calculator 150 calculates the privacy stress data of the current frame based on the public stress data and stress index, which are stored in the memory 140. Since the privacy stress data does not need to be accumulated and stored, a size of the memory 140 may be minimized.

The compensator 160 performs stress compensation for the image input signal RGB based on the stress data STR_D (operation S120).

The compensator 160 outputs the stress-compensated image data signal DS (operation S130).

When it is determined that the mode signal MD does not indicate the public mode in operation S100 and that the mode signal MD does not indicate the partial mode in operation S140, the stress data calculator 150 may determine the operation mode as the privacy mode. During the privacy mode illustrated in FIG. 9C, the privacy light-emitting elements ED2 in the first pixels PXa of the first display area DA1 and the privacy light-emitting elements ED4 in the second pixels PXb of the second display area DA2 emit light.

The stress data calculator 150 calculates stress data for the privacy light-emitting elements ED2 and ED4, that is, privacy stress data (operation S160). The stress data calculator 150 provides the privacy stress data as the stress data STR_D to the compensator 160.

The compensator 160 performs stress compensation for the image input signal RGB based on the stress data STR_D (operation S120).

The compensator 160 outputs the stress-compensated image data signal DS (operation S130).

Figure 13:
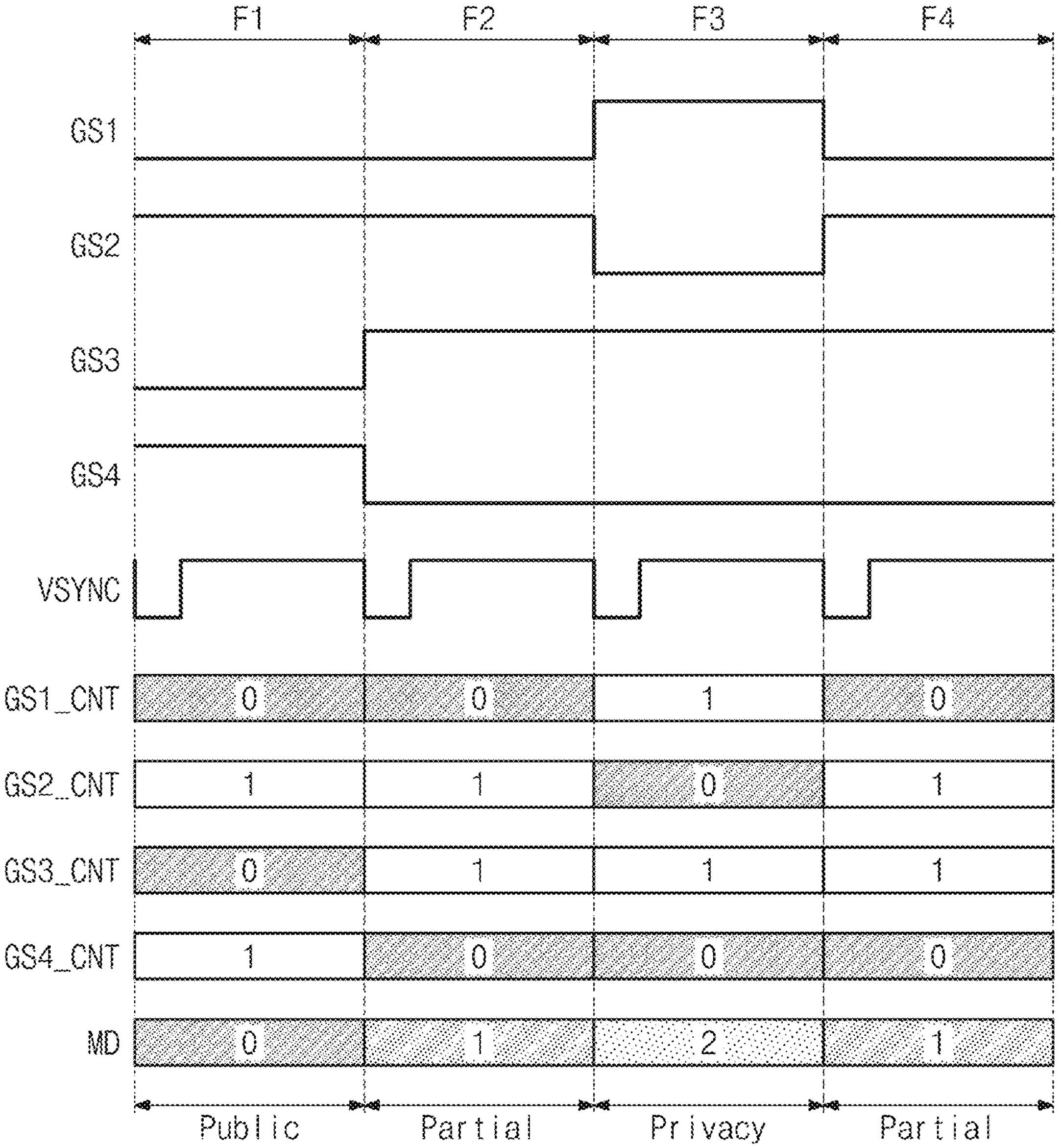
FIG. 13 is a diagram illustratively showing a method in which an operation mode determiner determines an operation mode based on first to fourth selection signals, according to an embodiment of the present disclosure.

FIG. 13 is a diagram illustrating an example of a method in which the operation mode determiner 120 determines the operation mode based on the first to fourth selection signals GS1, GS2, GS3, and GS4.

Referring to FIG. 11 and FIG. 13, the operation mode determiner 120 receives the first to fourth selection signals GS1, GS2, GS3, and GS4 from the control signal generator 110.

The operation mode determiner 120 may include counters corresponding to each of the first to fourth selection signals GS1, GS2, GS3, and GS4. Each of the counters may count up when a corresponding selection signal among the first to fourth selection signals GS1, GS2, GS3, and GS4 is in high level.

A first counter counts up when the first selection signal GS1 is in high level. Since the first selection signal GS1 is in high level in a third frame F3, a first count signal GS1_CNT output from the first counter is 0, 0, 1, and 0.

A second counter counts up when the second selection signal GS2 is in high level. Since the second selection signal GS2 is in high level in first, second, and fourth frames F1, F2, and F4, a second count signal GS2_CNT output from the second counter is 1, 1, 0, and 1.

A third counter counts up when the third selection signal GS3 is in high level. Since the third selection signal GS3 is in high level in second, third, and fourth frames F2, F3, and F4, a third count signal GS3_CNT output from the third counter is 0, 1, 1, and 1.

A fourth counter counts up when the fourth selection signal GS4 is in high level. Since the fourth selection signal GS4 is in high level in the first frame F1, a fourth count signal GS4_CNT output from the fourth counter is 1, 0, 0, and 0.

The operation mode determiner 120 outputs the mode signal MD based on the first to fourth count signals GS1_CNT, GS2_CNT, GS3_CNT, and GS4_CNT of the counters. In an embodiment, the operation mode determiner 120 may output a sum of the first count signal GS1_CNT and the third count signal GS3_CNT as the mode signal MD.

The stress data calculator 150 may determine the operation mode as the public mode, the partial mode, and the privacy mode when the mode signal MD is 0, 1, and 2, respectively.

The public emission determiner 130 may determine whether at least one of the public light-emitting elements ED1 and ED3 emits light based on the first to fourth selection signals GS1, GS2, GS3, and GS4.

The public emission determiner 130 determines that the image input signal RGB of the current frame corresponds to the public light-emitting elements ED1 and ED3 when the first and third selection signals GS1 and GS3 are in low level, and outputs the public emission signal PE of the active level.

The public emission determiner 130 determines that the image input signal RGB of the current frame corresponds to the privacy light-emitting elements ED2 and ED4 when the first and third selection signals GS1 and GS3 are in high level, and outputs the public emission signal PE of the inactive level.

For example, when the first selection signal GS1 is in low level and the second selection signal GS2 is in high level, the image input signal RGB of the current frame corresponds to the public light-emitting element ED1, so the public emission determiner 130 outputs the public emission signal PE of the active level.

For example, when the third selection signal GS3 is in high level and the fourth selection signal GS4 is in low level, the image input signal RGB of the current frame corresponds to the privacy light-emitting element ED4, so the public emission determiner 130 outputs the public emission signal PE of the inactive level.

Figure 14:
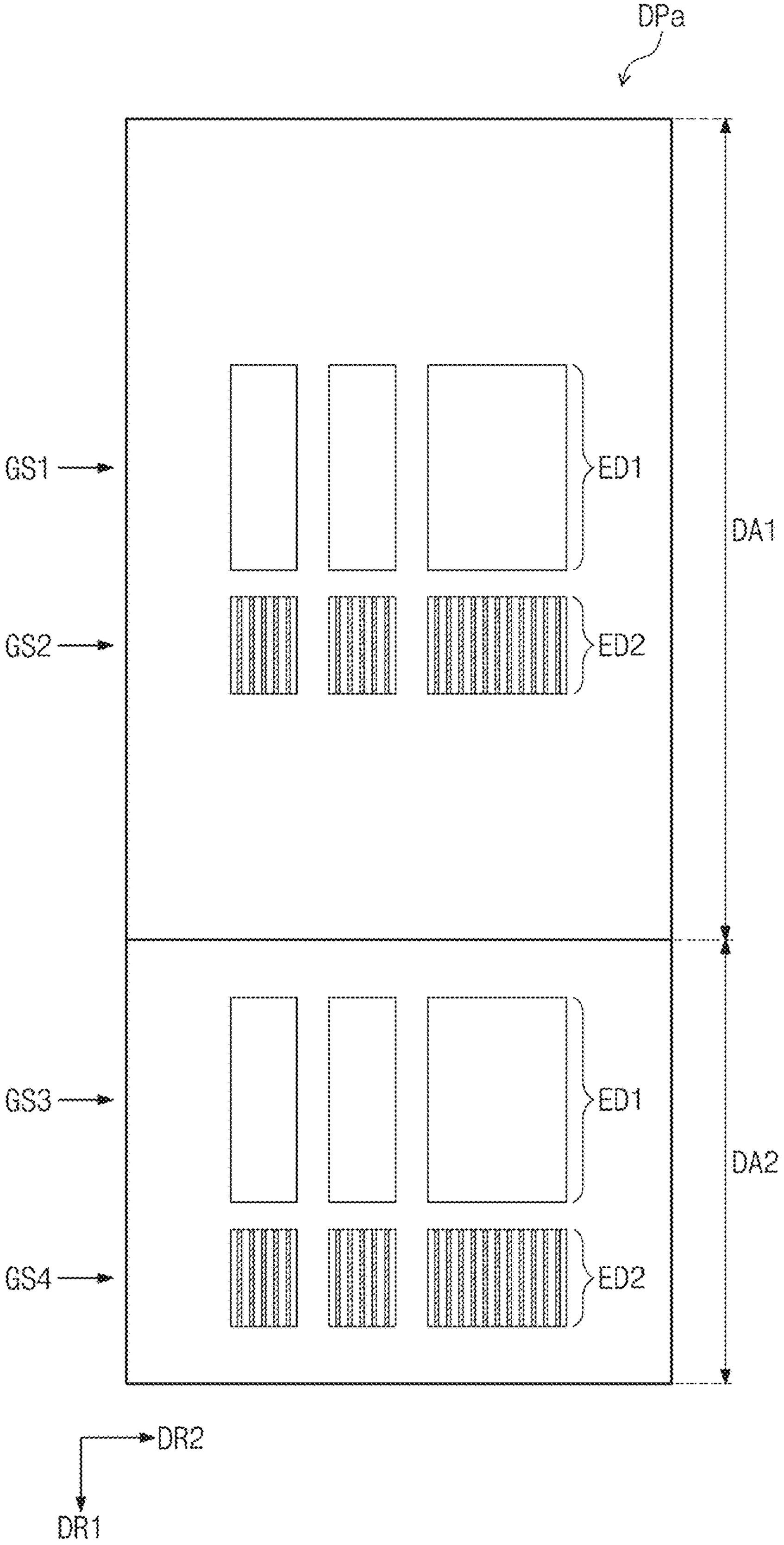
FIG. 14 is a diagram illustratively showing a display panel, according to an embodiment of the present disclosure.

FIG. 14 is a diagram illustratively showing a display panel DPa, according to an embodiment of the present disclosure.

Referring to FIG. 14, the display panel DPa has a long side in the first direction DR1 and a short side in the second direction DR2.

The display panel DPa includes the first display area DA1 and the second display area DA2. In the example illustrated in FIG. 14, the first display area DA1 and the second display area DA2 are sequentially disposed along the long side of the display panel DP, i.e., the first direction DR1, but the present disclosure is not limited thereto.

In the same manner as illustrated in FIG. 3 and FIG. 9A, the public light-emitting elements ED1 and the privacy light-emitting elements ED2 are disposed in the first display area DA1, and the public light-emitting elements ED3 and the privacy light-emitting elements ED4 are disposed in the second display area DA2.

The display panel DPa may operate such that the public light-emitting elements ED1 and the privacy light-emitting elements ED2 emit light in response to the first and second selection signals GS1 and GS2.

The display panel DPa may operate such that the public light-emitting elements ED3 and the privacy light-emitting elements ED4 emit light in response to the third and fourth selection signals GS3 and GS4.

The display panel DPa may operate in the public mode, the partial mode, and the privacy mode according to the operation of the driving controller 100 illustrated in FIGS. 11 and 12.

Figure 15:
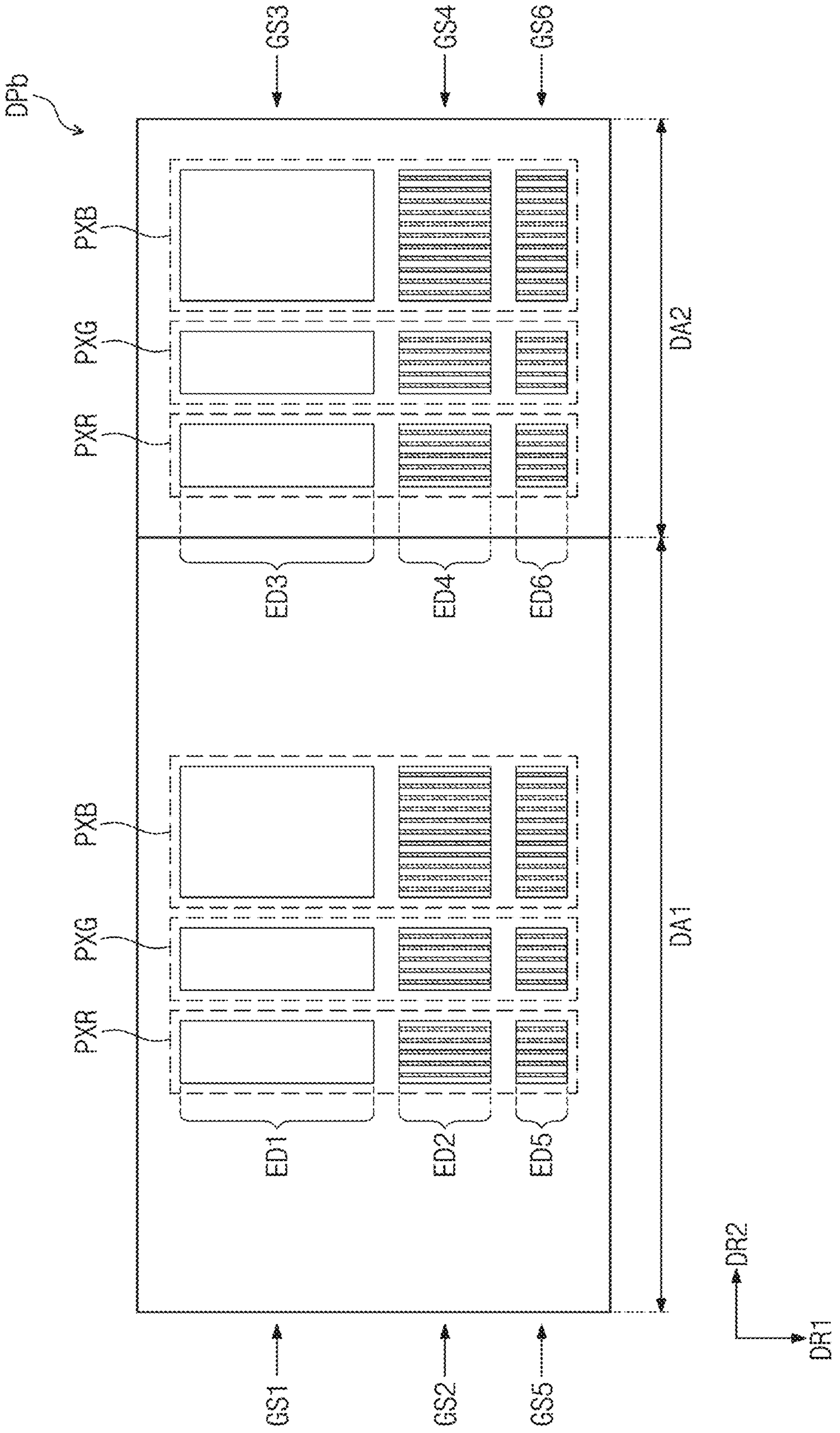
FIG. 15 is a diagram illustratively showing a display panel, according to an embodiment of the present disclosure.

FIG. 15 is a diagram illustratively showing a display panel DPb, according to an embodiment of the present disclosure.

Referring to FIG. 15, the display panel DPb includes the first display area DA1 and the second display area DA2.

The public light-emitting elements ED1 and privacy light-emitting elements ED2 and ED5 are disposed in the first display area DA1, and the public light-emitting elements ED3 and privacy light-emitting elements ED4 and ED6 are disposed in the second display area DA2.

In an embodiment, each of the first color pixel PXR, the second color pixel PXG, and the third color pixel PXB in the first display area DA1 of the display panel DPb may include the public light-emitting element ED1 and the privacy light-emitting elements ED2 and ED5.

In an embodiment, each of the first color pixel PXR, the second color pixel PXG, and the third color pixel PXB in the second display area DA2 of the display panel DPb may include the public light-emitting element ED3 and the privacy light-emitting elements ED4 and ED6.

The public light-emitting elements ED1 and ED3 illustrated in FIG. 15 may be the same as the public light-emitting elements ED_R1, ED_G1, and ED_B1 illustrated in FIG. 7. The privacy light-emitting elements ED2, ED4, ED5, and ED6 illustrated in FIG. 15 may be the same as the privacy light-emitting elements ED_R2, ED_G2, and ED_B2 illustrated in FIG. 7.

Each of the first color pixel PXR, the second color pixel PXG, and the third color pixel PXB in the first display area DA1 of the display panel DPb may be operated to cause the public light-emitting elements ED1 and the privacy light-emitting elements ED2 and ED5 to emit light in response to the first, second, and fifth selection signals GS1, GS2, and GS5.

Each of the first color pixel PXR, the second color pixel PXG, and the third color pixel PXB in the second display area DA2 of the display panel DPb may be operated to cause the public light-emitting elements ED3 and the privacy light-emitting elements ED4 and ED6 to emit light in response to the third, fourth, and sixth selection signals GS3, GS4, and GS6.

Figure 16:
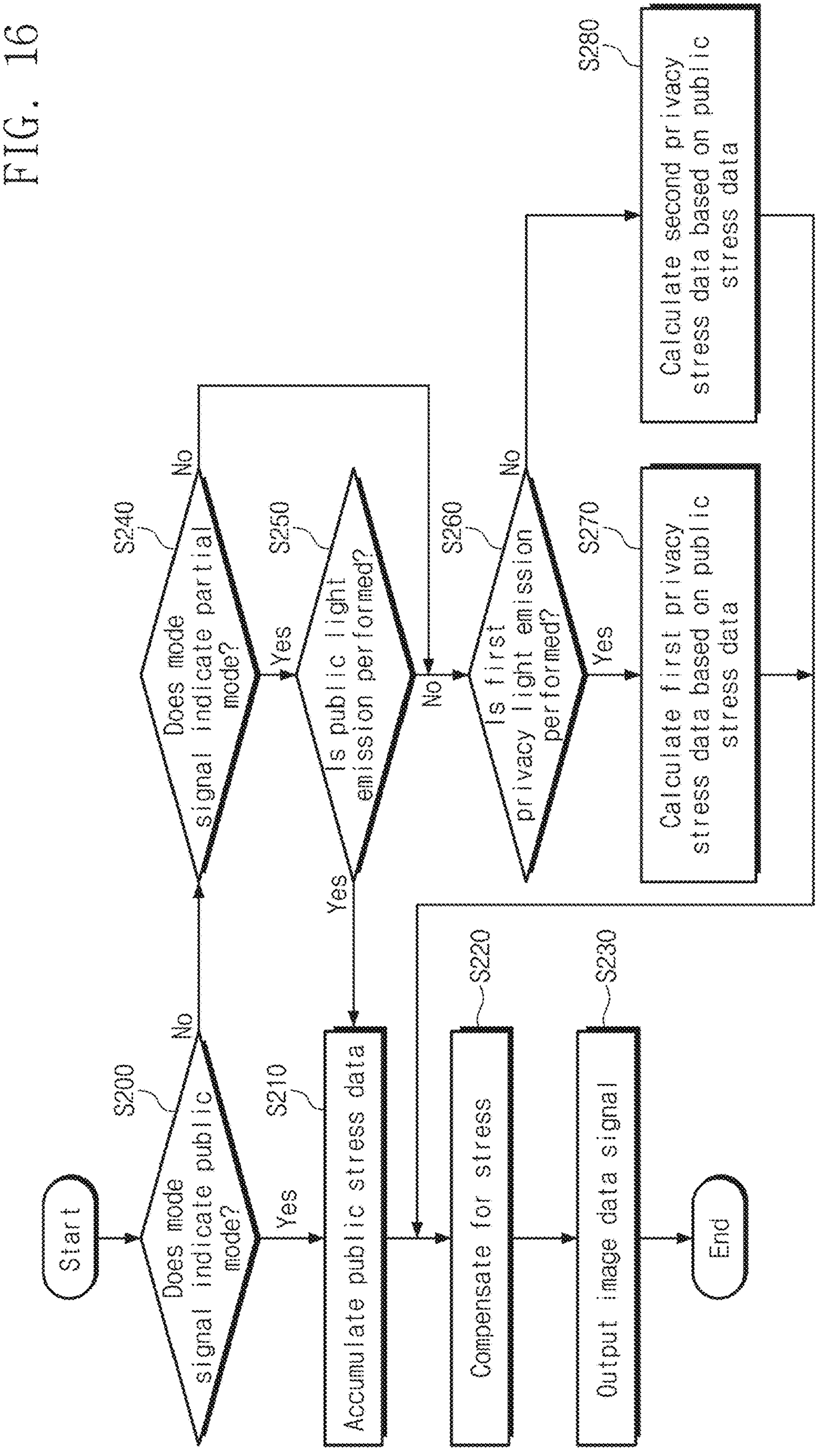
FIG. 16 is a flowchart illustrating an operation, according to an embodiment of the a driving controller.

FIG. 16 is a flowchart illustrating an operation, according to an embodiment of the driving controller 100.

Some of the operations of the driving controller 100 illustrated in FIG. 16, for example, operations S200, S210, S220, S230, S240, and S250 are identical or similar to operations S100, S110, S120, S130, S140, and S150 illustrated in FIG. 12, and therefore, additional descriptions thereof will be omitted to avoid redundancy.

Referring to FIG. 11, FIG. 15, and FIG. 16, the stress data calculator 150 determines whether the first privacy light-emitting elements ED4 in the second display area DA2 emit light (operation S260).

When the first privacy light-emitting element ED4 emits light, that is, the image input signal RGB corresponds to the first privacy light-emitting element ED4, the stress data calculator 150 may calculate first privacy stress data by adding the public stress data accumulated up to the previous frame stored in the memory 140 and the image input signal RGB (operation S270).

As illustrated in FIG. 15, the display panel DPb includes the first color pixel PXR, the second color pixel PXG, and the third color pixel PXB. The degradation characteristics of each of the first color pixel PXR, the second color pixel PXG, and the third color pixel PXB may be different from each other. In addition, the operation time and stress level of each of the first color pixel PXR, the second color pixel PXG, and the third color pixel PXB may be different depending on an operating environment. Therefore, the privacy stress data for each of the first color pixel PXR, the second color pixel PXG, and the third color pixel PXB should be calculated.

The following Equations 4, 5, and 6 indicate formulas by which the stress data calculator 150 calculates the privacy stress data for each of the first privacy light-emitting element ED4 in the first color pixel PXR, the first privacy light-emitting element ED4 in the second color pixel PXG, and the first privacy light-emitting element ED4 in the third color pixel PXB.

$$PRI\_STR\_R1 = PUB\_STR\_R \times SI\_R1 \quad \text{[Equation 4]}$$

First privacy stress data PRI_STR_R1 for the first privacy light-emitting element ED4 may be calculated by a product of the public stress data PUB_STR_R for the public light-emitting element ED3 in the first color pixel PXR and a stress index SI_R1.

$$PRI\_STR\_G1 = PUB\_STR\_G \times SI\_G1 \quad \text{[Equation 5]}$$

The first privacy stress data PRI_STR_G1 for the first privacy light-emitting element ED4 may be calculated by a product of the public stress data PUB_STR_G for the public light-emitting element ED3 in the second color pixel PXG and the stress index SI_G1.

$$PRI\_STR\_B1 = PUB\_STR\_B \times SI\_B1 \quad \text{[Equation 6]}$$

First privacy stress data PRI_STR_B1 for the first privacy light-emitting element ED4 may be calculated by a product of the public stress data PUB_STR_B for the public light-emitting element ED3 in the third color pixel PXB and a stress index SI_B1.

In an embodiment, the stress indices SI_R1, SI_G1, and SI_B1 may be calculated based on the aperture ratios of the public light-emitting elements ED3 and the first privacy light-emitting elements ED4.

The following Table 2 illustrates an example of the stress indices SI_R1, SI_G1, and SI_B1 corresponding to the aperture ratios of the public light-emitting elements ED3 and the first privacy light-emitting elements ED4.

TABLE 2

| | PXR | PXG | PXB |
|---|---|---|---|
| Public light-emitting element | 10.0% | 10.0% | 50.0% |
| First privacy light-emitting element | 5.0% | 5.0% | 25.0% |
| Stress Index | 2.0 | 2.0 | 2.0 |

The stress index SI_R1 is obtained by the ratio of the public light-emitting element ED3 to the first privacy light-emitting element ED4, which is 10.0/5.0=2.0.

The stress index SI_G1 is obtained by the ratio of the public light-emitting element ED3 to the first privacy light-emitting element ED4, which is 10.0/5.0=2.0.

The stress index SI_B1 is obtained by the ratio of the public light-emitting element ED3 to the first privacy light-emitting element ED4, which is 50.0/25.0=2.0.

The stress data calculator 150 provides the privacy stress data PRI_STR_R1, PRI_STR_G1, and PRI_STR_B1 for each of the first privacy light-emitting element ED4 in the first color pixel PXR, the first privacy light-emitting element ED4 in the second color pixel PXG, and the first privacy light-emitting element ED4 in the third color pixel PXb as the stress data STR_D to the compensator 160.

In this way, the stress data calculator 150 calculates the first privacy stress data of the current frame based on the public stress data and the stress index, which are stored in the memory 140. Since the first privacy stress data does not need to be accumulated and stored, a size of the memory 140 may be minimized.

The compensator 160 performs stress compensation for the image input signal RGB based on the stress data STR_D (operation S220).

The compensator 160 outputs the stress-compensated image data signal DS (operation S230).

In operation S260, when it is determined that the first privacy light-emitting elements ED4 do not emit light, that is, if the image input signal RGB corresponds to the second privacy light-emitting elements ED6, the stress data calculator 150 may calculate a second privacy stress data by adding the public stress data accumulated up to the previous frame stored in the memory 140 and the image input signal RGB (operation S280).

The following Equations 7, 8, and 9 indicate formulas by which the stress data calculator 150 calculates the privacy stress data for each of the second privacy light-emitting element ED6 in the first color pixel PXR, the second privacy light-emitting element ED6 in the second color pixel PXG, and the second privacy light-emitting element ED6 in the third color pixel PXB.

$$PRI\_STR\_R2 = PUB\_STR\_R \times SI\_R2 \quad \text{[Equation 7]}$$

Second privacy stress data PRI_STR_R2 for the second privacy light-emitting element ED6 may be calculated by a product of the public stress data PUB_STR_G for the public light-emitting element ED3 in the first color pixel PXR and a stress index SI_R2.

$$PRI\_STR\_G2 = PUB\_STR\_G \times SI\_G2 \quad \text{[Equation 8]}$$

Second privacy stress data PRI_STR_G2 for the second privacy light-emitting element ED6 may be calculated by a product of the public stress data PUB_STR_G for the public light-emitting element ED3 in the second color pixel PXG and a stress index SI_G2.

$$PRI\_STR\_B2 = PUB\_STR\_B \times SI\_B2 \quad \text{[Equation 9]}$$

Second privacy stress data PRI_STR_B2 for the second privacy light-emitting element ED6 may be calculated by a product of the public stress data PUB_STR_B for the public light-emitting element ED3 in the third color pixel PXB and a stress index SI_B2.

In an embodiment, the stress indices SI_R2, SI_G2, and SI_B2 may be calculated based on the aperture ratios of the public light-emitting elements ED3 and the second privacy light-emitting elements ED6.

The following Table 3 illustrates an example of the stress indices SI_R2, SI_G2, and SI_B2 corresponding to the aperture ratios of the public light-emitting elements ED3 and the second privacy light-emitting elements ED6.

TABLE 3

| | PXR | PXG | PXB |
|---|---|---|---|
| Public light-emitting element | 10.0% | 10.0% | 50.0% |
| First privacy light-emitting element | 3.0% | 3.0% | 12.5% |
| Stress Index | 3.3 | 3.3 | 4.0 |

The stress index SI_R2 is obtained by the ratio of the public light-emitting element ED3 to the second privacy light-emitting element ED6, which is 10.0/3.0=3.3.

The stress index SI_G2 is obtained by the ratio of the public light-emitting element ED3 to the second privacy light-emitting element ED6, which is 10.0/3.0=3.3.

The stress index SI_B2 is obtained by the ratio of the public light-emitting element ED3 to the second privacy light-emitting element ED6, which is 50.0/12.5=4.0.

The stress data calculator 150 provides the privacy stress data PRI_STR_R2, PRI_STR_G2, and PRI_STR_B2 for each of the second privacy light-emitting element ED6 in the first color pixel PXR, the second privacy light-emitting element ED6 in the second color pixel PXG, and the second privacy light-emitting element ED6 in the third color pixel PXB as the stress data STR_D to the compensator 160.

In this way, the stress data calculator 150 calculates the second privacy stress data of the current frame based on the public stress data and the stress index, which are stored in the memory 140. Since the second privacy stress data does not need to be accumulated and stored, a size of the memory 140 may be minimized.

The compensator 160 performs stress compensation for the image input signal RGB based on the stress data STR_D (operation S220).

The compensator 160 outputs the stress-compensated image data signal DS (operation S230).

When it is determined that the mode signal MD does not indicate the public mode in operation S200 and that the mode signal MD does not indicate the partial mode in operation S240, the stress data calculator 150 may determine the operation mode as the privacy mode. During the privacy mode, the driving controller 100 may perform operation S260 and may perform any one of operation S270 and operation S280.

During the privacy mode, the compensator 160 performs stress compensation for the image input signal RGB based on the stress data STR_D provided from the stress data calculator 150 (operation S220).

The compensator 160 outputs the stress-compensated image data signal DS (operation S230).

Figure 17:
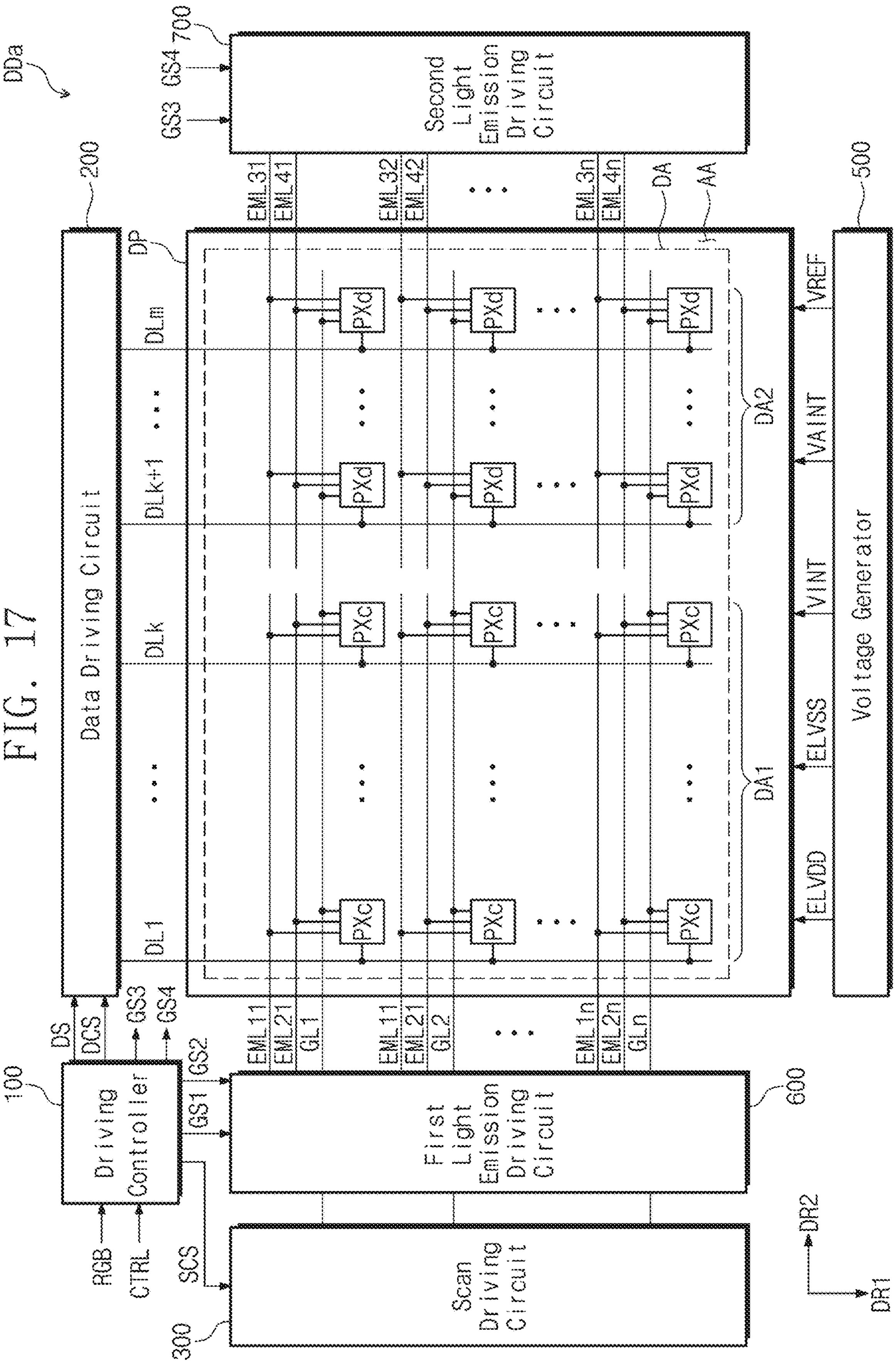
FIG. 17 is a block diagram of a display device, according to an embodiment of the present disclosure.

FIG. 17 is a block diagram of a display device DDa, according to an embodiment of the present disclosure.

Referring to FIG. 17, the display device DDa includes the display panel DP, the driving controller 100, the data driving circuit 200, the scan driving circuit 300, the voltage generator 500, a first light emission driving circuit 600, and a second light emission driving circuit 700.

Among the components of the display device DDa illustrated in FIG. 17, components that are identical or similar to the components of the display device DD illustrated in FIG. 3 are indicated with the same reference numerals, and additional descriptions are omitted to avoid redundancy.

The first light emission driving circuit 600 receives the first and second selection signals GS1 and GS2 from the driving controller 100. The first light emission driving circuit 600 outputs first emission signals to first light emission lines EML11 to EML1*n* in response to the first selection signal GS1, and outputs second emission signals to second light emission lines EML21 to EML2*n* in response to the second selection signal GS2.

The second light emission driving circuit 700 receives the third and fourth selection signals GS3 and GS4 from the driving controller 100. The second light emission driving circuit 700 outputs third emission signals to third light emission lines EML31 to EML3*n* in response to the third selection signal GS3, and outputs fourth emission signals to fourth light emission lines EML41 to EML4*n* in response to the fourth selection signal GS4.

The display panel DP includes the data lines DL1 to DLm, the scan lines GL1 to GLn, the first light emission lines EML11 to EML1*n*, the second light emission lines EML21 to EML2*n*, the third light emission lines EML31 to EML3*n*, the fourth light emission lines EML41 to EML4*n*, first pixels PXc, and second pixels PXd.

The display panel DP includes the display area DA and the peripheral area AA. In an embodiment, the first pixels PXc and the second pixels PXd may be disposed in the display area DA.

In an embodiment, the scan driving circuit 300, the first light emission driving circuit 600, and the second light emission driving circuit 700 may be disposed in the peripheral area AA of the display panel DP. In an embodiment, the scan driving circuit 300, the first light emission driving circuit 600, and the second light emission driving circuit 700 may include transistors formed through the same process as the pixels PX.

Each of the first light emission lines EML11 to EML1*n* and the second light emission lines EML21 to EML2*n* extends from the first light emission driving circuit 600 in the second direction DR2. Each of the third light emission lines EML31 to EML3*n* and the fourth light emission lines EML41 to EML4*n* extends in the opposite direction of the second direction DR2 from the second light emission driving circuit 700. Each of the scan lines GL1 to GLn extends from the scan driving circuit 300 in the second direction DR2. The data lines DL1 to DLm extend from the data driving circuit 200 in the first direction DR1.

The display area DA of the display panel DP includes the first display area DA1 and the second display area DA2. In an embodiment, the first pixels PXc may be disposed in the first display area DA1, and the second pixels PXd may be disposed in the second display area DA2.

Each of the plurality of first pixels PXc is electrically connected to a corresponding one of the scan lines GL1 to GLn, a corresponding one of the data lines DL1 to DLm, a corresponding one of the first light emission lines EML11 to EML1*n*, and a corresponding one of the second light emission lines EML21 to EML2*n*.

Each of the plurality of second pixels PXd is electrically connected to a corresponding one of the scan lines GL1 to GLn, a corresponding one of the data lines DL1 to DLm, a corresponding one of the third light emission lines EML31 to EML3*n*, and a corresponding one of the fourth light emission lines EML41 to EML4*n*.

For example, as illustrated in FIG. 17, the first pixels PXc of the first row may be connected to the first light emission line EML11, the second light emission line EML21, and the scan line GL1. The second pixels PXd of the first row may be connected to the third light emission line EML31, the fourth light emission line EML41, and the scan line GL1. The first pixels PXc of an n-th row may be connected to the first light emission line EML1*n*, the second light emission line EML2*n*, and the scan line GLn. The second pixels PXd of the n-th row may be connected to the third light emission line EML3*n*, the fourth light emission line EML4*n*, and the scan line GLn.

Each of the plurality of pixels PX receives the first driving voltage ELVDD, the second driving voltage ELVSS, the first initialization voltage VINT, the second initialization voltage VAINT, and the reference voltage VREF.

In FIG. 17, the scan driving circuit 300, the first light emission driving circuit 600, and the second light emission driving circuit 700 are illustrated and described as being implemented as independent circuits, but the present disclosure is not limited thereto. For example, the scan driving circuit 300, the first light emission driving circuit 600, and the second light emission driving circuit 700 may be configured as one circuit. In an embodiment, the first light emission driving circuit 600 and the second light emission driving circuit 700 may be configured as one circuit.

In an embodiment, the display panel DP may include a long side and a short side. The long side of the display panel DP extends in the second direction DR2, and the short side of the display panel DP extends in the first direction DR1.

In an embodiment, the scan driving circuit 300, the first light emission driving circuit 600, and the second light emission driving circuit 700 may be disposed adjacent to the short side of the display panel DP. In an embodiment, the data driving circuit 200 may be disposed adjacent to the long side of the display panel DP.

In FIG. 17, the first display area DA1 and the second display area DA2 are illustrated as being sequentially disposed along the long side of the display panel DP, i.e., the second direction DR2, but the present disclosure is not limited thereto.

In an embodiment, the driving controller 100 of the display device DDa illustrated in FIG. 17 may include the same configurations as the driving controller 100 illustrated in FIG. 11 and may operate in the same manner.

Figure 18:
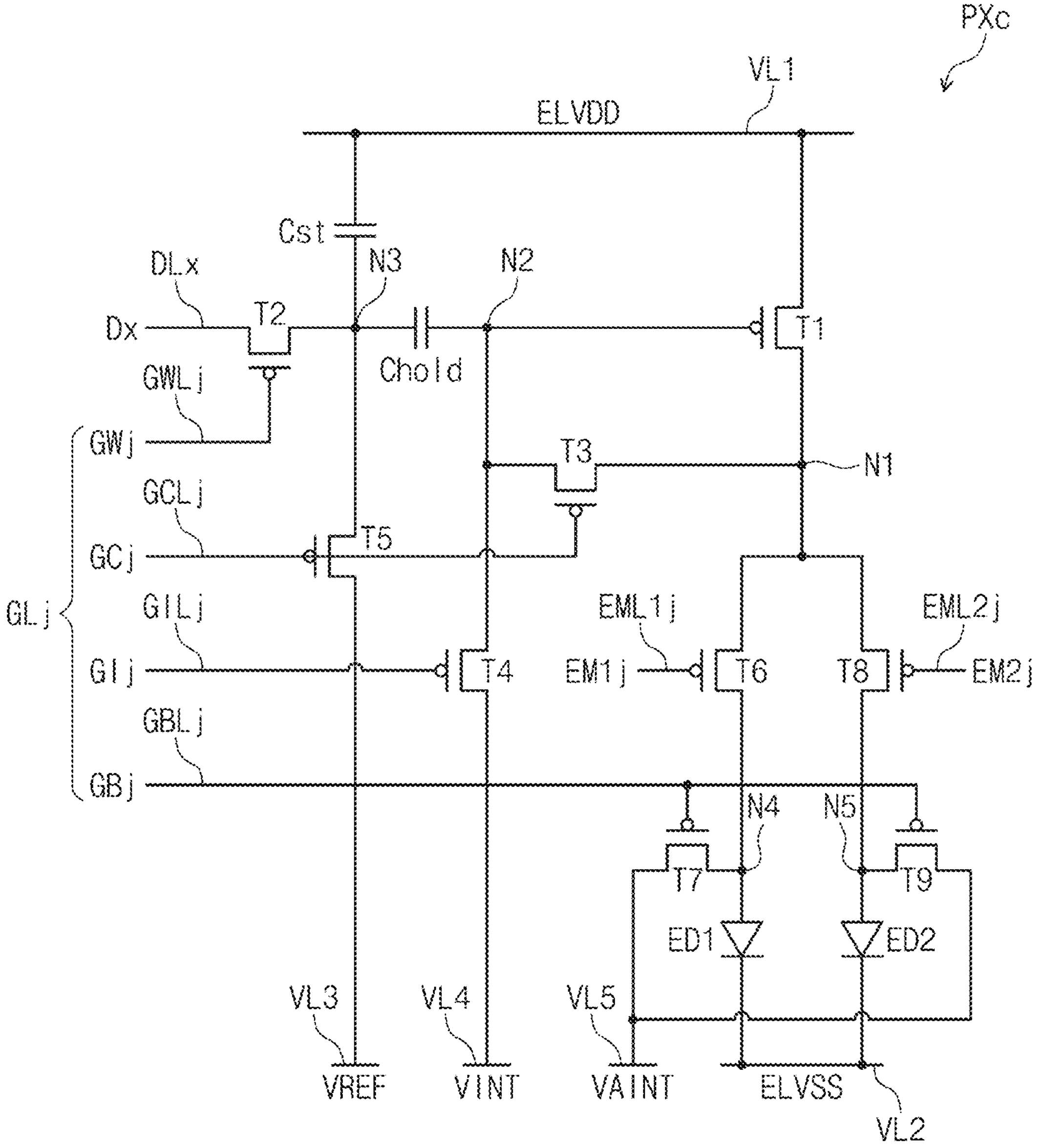
FIG. 18 is a circuit diagram of a first pixel, according to an embodiment of the present disclosure.

FIG. 18 is a circuit diagram of the first pixel PXc, according to an embodiment of the present disclosure.

FIG. 18 illustrates a circuit diagram of the first pixel PXc connected to the x-th data line DLx among the data lines DL1 to DLm, the j-th scan line GLj among the scan lines GL1 to GLn, the j-th first light emission line EML1*j* among the first light emission lines EML11 to EML1*n*, and the j-th second light emission line EML2*j* among the second light emission lines EML21 to EML2*n*, which are illustrated in FIG. 17.

In an embodiment, the first pixel PXc includes first to ninth transistors T1 to T9, capacitors Cst and Chold, the public light-emitting element ED1, and the privacy light-emitting element ED2.

Among the components of the first pixel PXc illustrated in FIG. 18, components similar to those of the first pixel PXa illustrated in FIG. 4 are indicated with the same reference numerals, and additional descriptions are omitted to avoid redundancy.

The sixth transistor T6 is connected between the first node N1 and the fourth node N4, and includes a gate electrode connected to the first light emission line EML1*j*.

The eighth transistor T8 is connected between the first node N1 and the fifth node N5, and includes a gate electrode connected to the second light emission line EML2*j*.

The public light-emitting element ED1 includes an anode connected to the fourth node N4 and a cathode connected to the second driving voltage line VL2. The privacy light-emitting element ED2 includes an anode connected to the fifth node N5 and a cathode connected to the second driving voltage line VL2.

Figure 19:
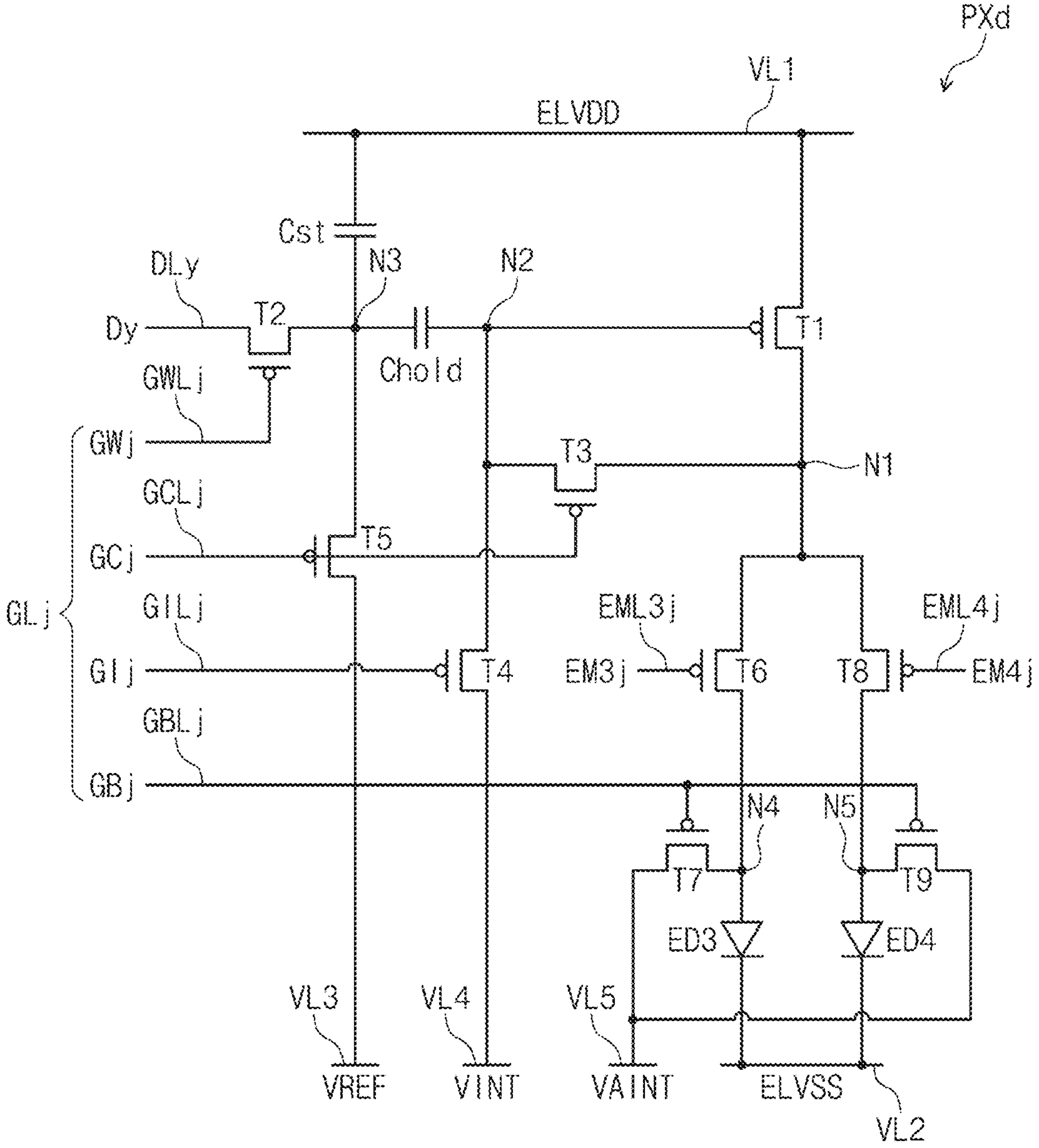
FIG. 19 is a circuit diagram of a second pixel, according to an embodiment of the present disclosure.

FIG. 19 is a circuit diagram of the second pixel PXd, according to an embodiment of the present disclosure.

FIG. 19 illustrates a circuit diagram of the second pixel PXd connected to the y-th data line DLy among the data lines DL1 to DLm, the j-th scan line GLj among the scan lines GL1 to GLn, the j-th third light emission line EML3*j* among the first light emission lines EML31 to EML3*n*, the j-th fourth light emission line EML4*j* among the second light emission lines EML41 to EML4*n*, and the third and fourth selection lines GSL3 and GSL4, which are illustrated in FIG. 3.

In an embodiment, the second pixel PXd includes the first to ninth transistors T1 to T9, the capacitors Cst and Chold, the public light-emitting element ED3, and the privacy light-emitting element ED4.

Among the components of the second pixel PXd illustrated in FIG. 19, components similar to those of the first pixel PXa illustrated in FIG. 4 are indicated with the same reference numerals, and additional descriptions are omitted to avoid redundancy.

The second transistor T2 is connected between the data line DLy and the third node N3, and includes a gate electrode connected to the scan line GWLj. The data line DLy may transfer the data signal Dy.

The sixth transistor T6 is connected between the first node N1 and the fourth node N4, and includes a gate electrode connected to the third light emission line EML3*j*.

The eighth transistor T8 is connected between the first node N1 and the fifth node N5, and includes a gate electrode connected to the fourth light emission line EML4*j*.

The public light-emitting element ED3 includes an anode connected to the fourth node N4 and a cathode connected to the second driving voltage line VL2. The privacy light-emitting element ED4 includes an anode connected to the fifth node N5 and a cathode connected to the second driving voltage line VL2.

Figure 20A:
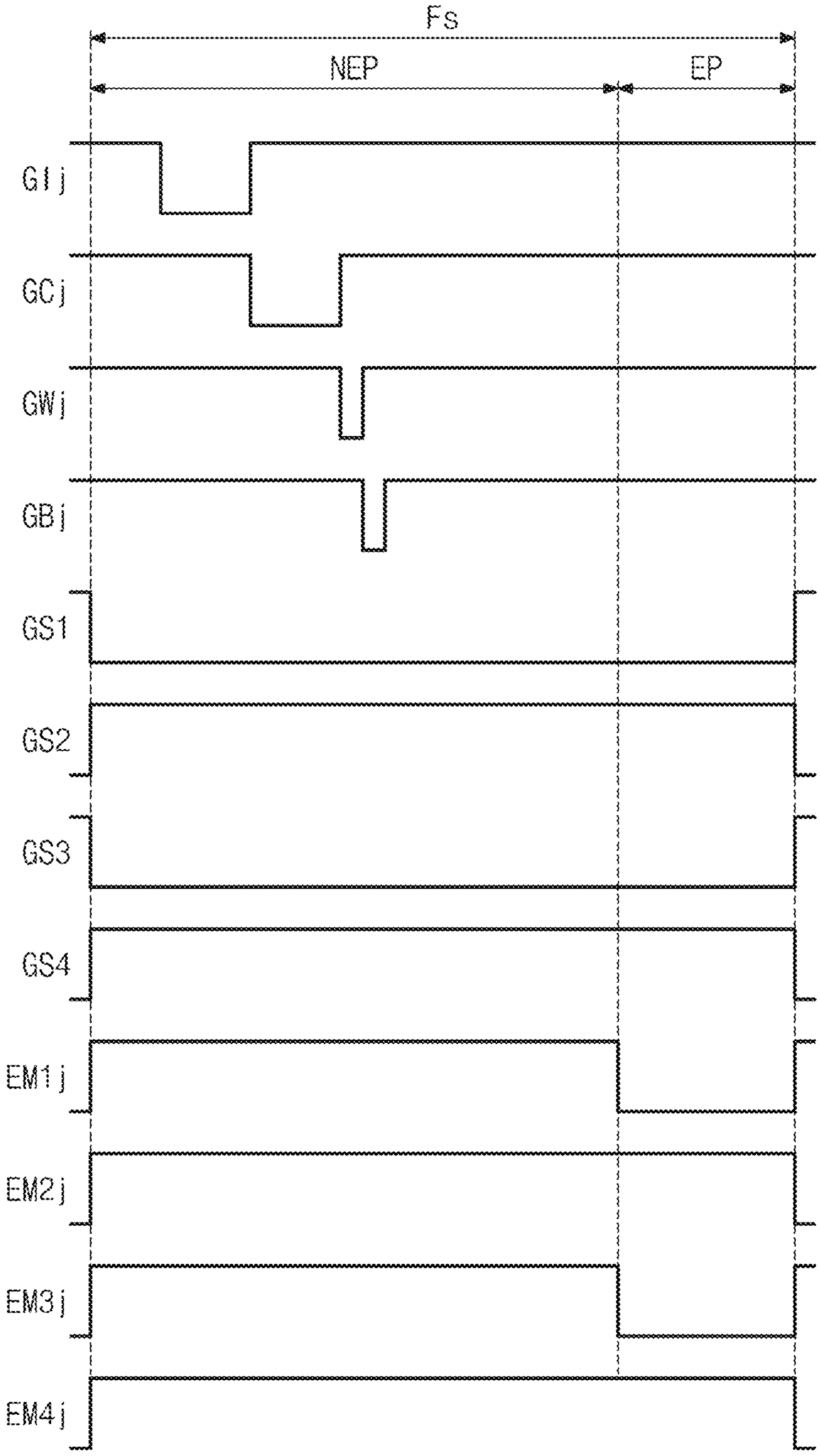
FIG. 20A is a timing diagram for describing an operation of a first pixel and a second pixel during a public mode.
Figure 20B:
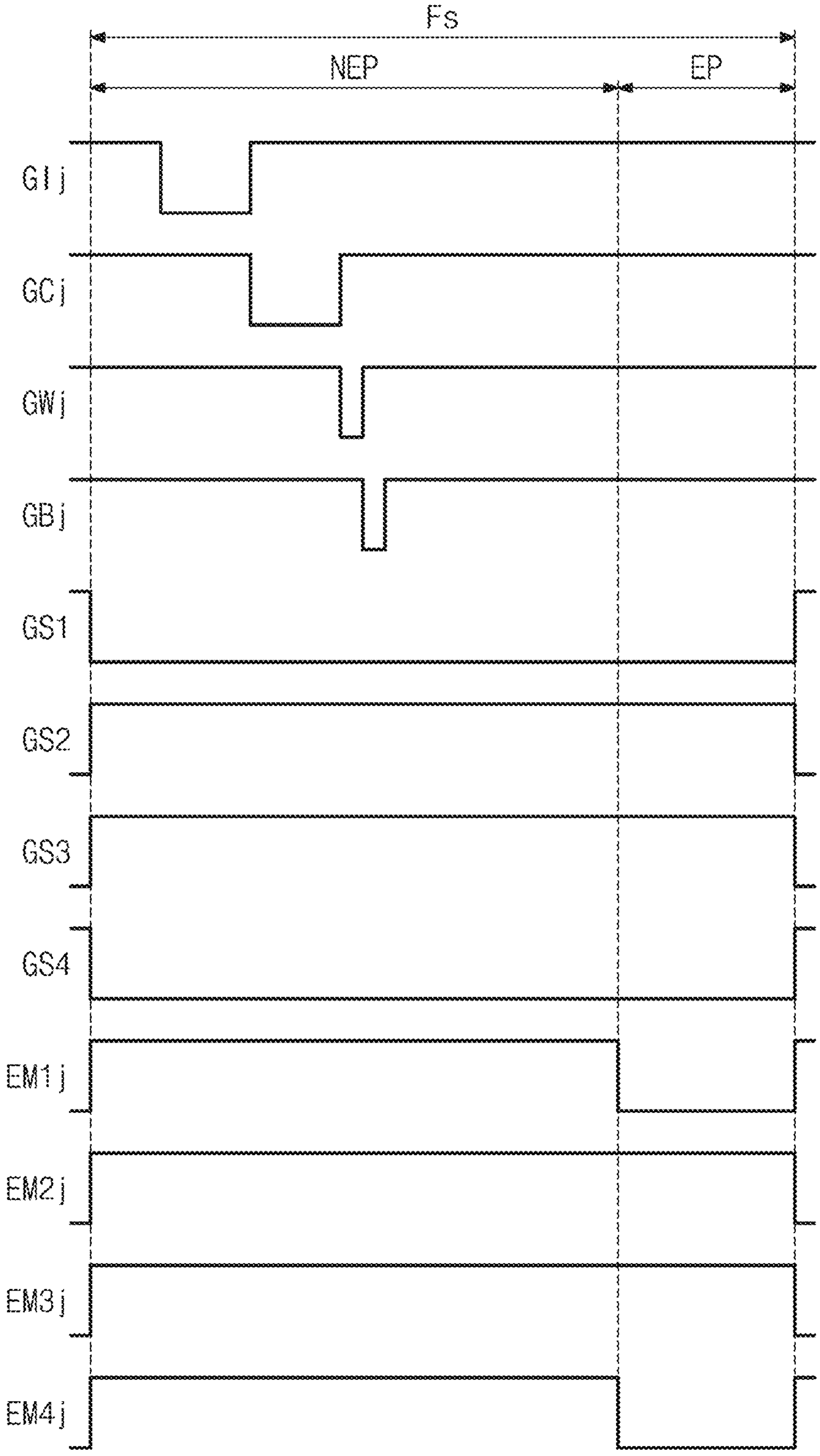
FIG. 20B is a timing diagram for describing an operation of a first pixel and a second pixel during a partial mode.
Figure 20C:
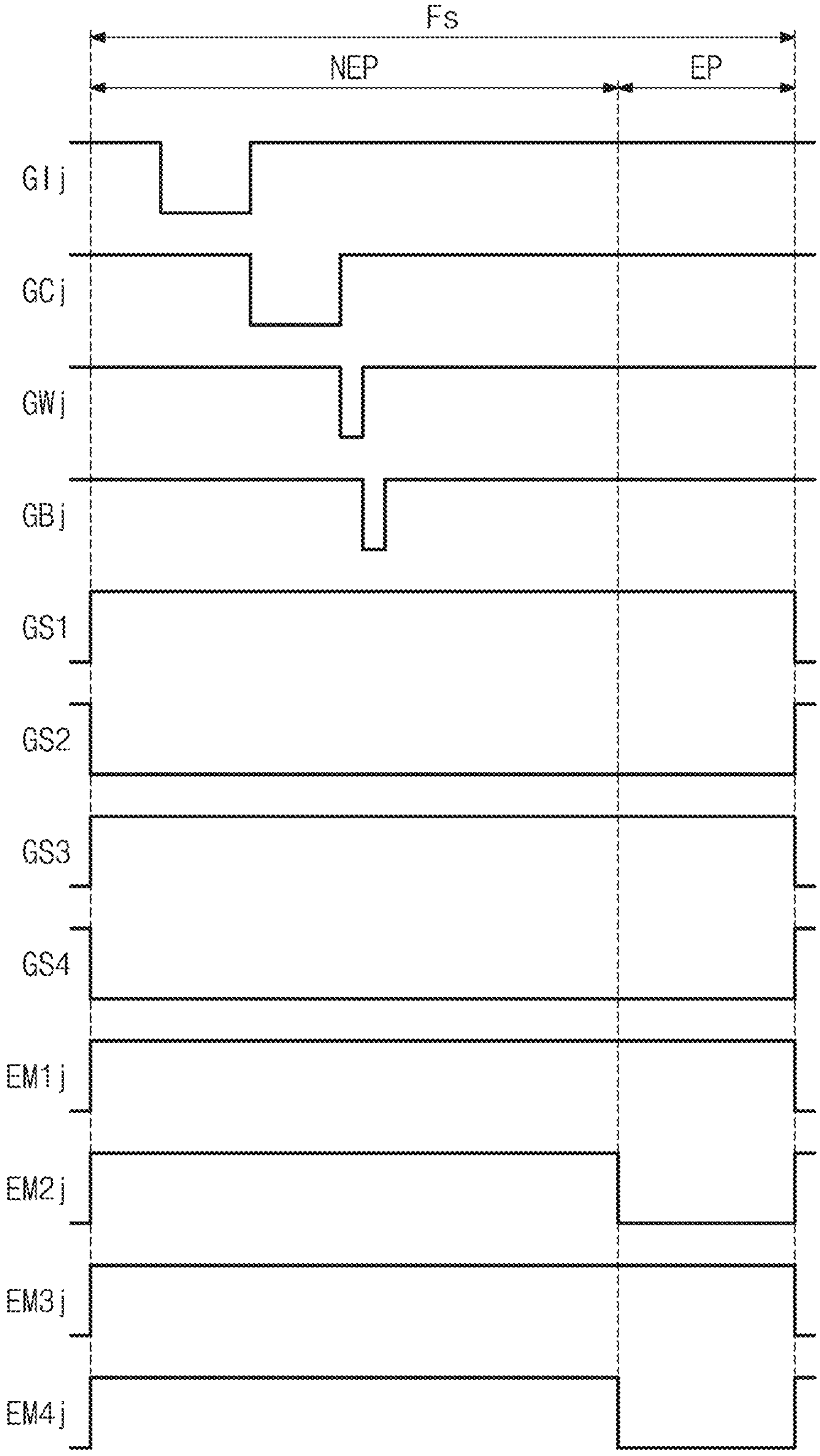
FIG. 20C is a timing diagram for describing an operation of a first pixel and a second pixel during a privacy mode.

FIG. 20A, FIG. 20B, and FIG. 20C are timing diagrams for describing operations of the first pixel PXc and the second pixel PXd.

Among the operations of the first pixel PXc and the second pixel PXd, operations similar to those of the first pixel PXa and the second pixel PXb illustrated in FIG. 6A, FIG. 6B, and FIG. 6C are omitted for description.

FIG. 20A is a timing diagram for describing the operation of the first pixel PXc and the second pixel PXd during the public mode.

Referring to FIG. 17, FIG. 18, and FIG. 20A, one frame Fs includes the non-emission period NEP and the emission period EP. The non-emission period NEP may be a period in which the scan signals GIj, GCj, GWj, and GBj are activated, and the emission period EP may be a period in which at least one of first to fourth emission signals EM1*j*, EM2*j*, EM3*j*, and EM4*j* is activated. During the public mode, the first to fourth selection signals GS1, GS2, GS3, and GS4 are in low level, high level, low level, and high level, respectively.

Since the first and third selection signals GS1 and GS3 are in low level during the public mode, the first light emission driving circuit 600 and the second light emission driving circuit 700 output the first and third emission signals EM1*j* and EM3*j* at low level, respectively, during the emission period EP. Therefore, during the public mode, the public light-emitting element ED1 may emit light corresponding to the data signal Dx, and the public light-emitting element ED3 may emit light corresponding to the data signal Dy.

Since the second and fourth selection signals GS2 and GS4 are in high level during the public mode, the first light emission driving circuit 600 and the second light emission driving circuit 700 maintain the second and fourth emission signals EM2*j* and EM4*j* at high level. Therefore, during the public mode, the privacy light-emitting element ED2 and the privacy light-emitting element ED4 do not emit light.

FIG. 20B is a timing diagram for describing the operation of the first pixel PXc and the second pixel PXd during the partial mode.

Referring to FIGS. 17, 18, and 20B, during the partial mode, the first to fourth selection signals GS1, GS2, GS3, and GS4 are in low level, high level, high level, and low level, respectively.

Since the first and fourth selection signals GS1 and GS4 are in low level during the partial mode, the first light emission driving circuit 600 and the second light emission driving circuit 700 output the first and fourth emission signals EM1*j* and EM4*j* at low level, respectively, during the emission period EP. Therefore, during the partial mode, the public light-emitting element ED1 may emit light corresponding to the data signal Dx, and the privacy light-emitting element ED4 may emit light corresponding to the data signal Dy.

Since the second and third selection signals GS2 and GS3 are in high level during the partial mode, the first light emission driving circuit 600 and the second light emission driving circuit 700 maintain the second and third emission signals EM2j and EM3j at high level, respectively. Therefore, during the partial mode, the privacy light-emitting element ED2 and the public light-emitting element ED3 do not emit light.

FIG. 20C is a timing diagram for describing the operation of the first pixel PXc and the second pixel PXd during the privacy mode.

Referring to FIGS. 17, 18, and 20C, during the privacy mode, the first to fourth selection signals GS1, GS2, GS3, and GS4 are in high level, low level, high level, and low level, respectively.

Since the second and fourth selection signals GS2 and GS4 are in low level during the privacy mode, the first light emission driving circuit 600 and the second light emission driving circuit 700 output the second and fourth emission signals EM2j and EM4j at low level during the emission period EP. Therefore, during the privacy mode, the privacy light-emitting element ED2 may emit light corresponding to the data signal Dx, and the privacy light-emitting element ED4 may emit light corresponding to the data signal Dy.

Since the first and third selection signals GS1 and GS3 are in high level during the privacy mode, the first light emission driving circuit 600 and the second light emission driving circuit 700 maintain the first and third emission signals EM1j and EM3j at high level, respectively. Therefore, the public light-emitting element ED1 and the public light-emitting element ED3 do not emit light during the public mode.

According to an embodiment of the present disclosure, the display device may display an image in only one of a first display area and a second display area. Accordingly, power consumption of the display device may be reduced.

The pixel includes the public light-emitting element and the privacy light-emitting element including the light control pattern. The public light-emitting element of the pixel in the area displaying the image in the first display area and the second display area does not display the image, and only the privacy light-emitting element may display the image. Therefore, viewing the image of the display device from a specific direction may be restricted.

In addition, the display device of the present disclosure may compensate for the deterioration deviation of the public light-emitting element and the privacy light-emitting element including the light control pattern. Therefore, the display quality of the display device may be improved.

Although the present disclosure has been described above with reference to embodiments thereof, it will be understood by those skilled in the art or having ordinary knowledge in the art that various modifications, and substitutions are possible, without departing from the spirit and the technical scope of the present disclosure as set forth in the claims below. Accordingly, the technical scope of the present disclosure is not limited to the detailed description of this specification, but should be defined by the claims.

What is claimed is:

1. A display device comprising:
a display panel; and
a driving controller configured to receive an image input signal, to output an image data signal, and to provide a first selection signal and a second selection signal to the display panel,
wherein the display panel includes:
a pixel including a public light-emitting element that emits light when the first selection signal is in an active level and a privacy light-emitting element that emits light when the second selection signal is in an active level; and
a light control pattern that overlaps the privacy light-emitting element on a plane of the display panel
wherein the driving controller is configured to:
calculate privacy stress data corresponding to degradation of the privacy light-emitting element based on public stress data corresponding to degradation of the public light-emitting element when the second selection signal is in the active level, and
perform a stress compensation for the image input signal based on the privacy stress data to compensate for degradation differences of the public light-emitting element and the privacy light-emitting element, and output the image data signal.

2. The display device of claim 1, wherein the driving controller includes:
a compensation control signal generator configured to receive a control signal and to output the first selection signal and the second selection signal;
an operation mode determiner configured to determine an operation mode based on the first selection signal and the second selection signal and to output a mode signal;
a public emission determiner configured to determine whether the image input signal corresponds to the privacy light-emitting element based on the first selection signal and the second selection signal and to output a public emission signal;
a stress data calculator configured to calculate stress data based on the image input signal and the public stress data in response to the mode signal and the public emission signal; and
a compensator configured to perform the stress compensation for the image input signal based on the stress data and to output the image data signal.

3. The display device of claim 2, wherein the driving controller further includes a memory configured to store the public stress data, and
wherein the stress data calculator calculates the stress data based on the public stress data stored in the memory and the image input signal.

4. The display device of claim 1, wherein the driving controller calculates the privacy stress data based on a product of the public stress data and a stress index when the second selection signal is in the active level.

5. The display device of claim 4, wherein the stress index is calculated based on an aperture ratio of the public light-emitting element and an aperture ratio of the privacy light-emitting element.

6. The display device of claim 5, wherein, when the aperture ratio of the public light-emitting element is greater than the aperture ratio of the privacy light-emitting element, the stress index has a value greater than "1".

7. The display device of claim 1, wherein the driving controller is configured to:
calculate privacy stress data corresponding to the public light-emitting element based on the public stress data corresponding to the public light-emitting element when the first selection signal is in the active level, and perform the stress compensation for the image input signal based on the public stress data, and to output the image data signal.

8. An electronic device comprising:

a display panel including a pixel including a public light-emitting element and a privacy light-emitting element; and a driving controller configured to receive an image input signal, to output an image data signal, and to provide a first selection signal and a second selection signal to the display panel, wherein the public light-emitting element has a first aperture ratio and emits light when the first selection signal is in an active level, wherein the privacy light-emitting element has a second aperture ratio different from the first aperture ratio and emits light when the second selection signal is in an active level, and wherein the driving controller is configured to:

calculate privacy stress data corresponding degradation of to the privacy light-emitting element based on a stress index corresponding to the first aperture ratio and the second aperture ratio, and public stress data corresponding to degradation of the public light-emitting element when the second selection signal is in the active level; and perform a stress compensation for the image input signal based on the privacy stress data to compensate for degradation differences of the public light-emitting element and the privacy light-emitting element, and output the image data signal.

9. The electronic device of claim 8, wherein the driving controller is configured to calculate the privacy stress data based on a product of the public stress data and the stress index when the second selection signal is in the active level.

10. The electronic device of claim 9, wherein the stress index is calculated based on a ratio of the first aperture ratio and the second aperture ratio.

11. The electronic device of claim 9, wherein, when the first aperture ratio is greater than the second aperture ratio, the stress index has a value greater than "1".

12. The electronic device of claim 8, wherein the display panel further includes:

a light control pattern that overlaps the privacy light-emitting element on a plane of the display panel.

13. The electronic device of claim 8, wherein the driving controller includes:

a compensation control signal generator configured to receive a control signal and to output the first selection signal and the second selection signal;

an operation mode determiner configured to determine an operation mode based on the first selection signal and the second selection signal and to output a mode signal;

a public emission determiner configured to determine whether the image input signal corresponds to the privacy light-emitting element based on the first selection signal and the second selection signal and to output a public emission signal;

a stress data calculator configured to calculate stress data based on the image input signal and the public stress data in response to the mode signal and the public emission signal; and a compensator configured to perform the stress compensation for the image input signal based on the stress data and to output the image data signal.

14. The electronic device of claim 13, wherein the driving controller further includes a memory configured to store the public stress data, and wherein the stress data calculator calculates the stress data based on the public stress data stored in the memory and the image input signal.

15. The electronic device of claim 8, wherein the driving controller is configured to:

calculate privacy stress data corresponding to the public light-emitting element based on public stress data corresponding to the public light-emitting element when the first selection signal is in the active level; and perform the stress compensation for the image input signal based on the privacy stress data, and to output the image data signal.

16. A method of driving a display device including a public light-emitting element and a privacy light-emitting element, the method comprising:

determining whether the privacy light-emitting element emits light;

calculating privacy stress data corresponding to degradation of the privacy light-emitting element based on public stress data corresponding to degradation of the public light-emitting element when the privacy light-emitting element emits light; and performing a stress compensation for an image input signal based on the privacy stress data to compensate for degradation differences of the public light-emitting element and the privacy light-emitting element, and outputting an image data signal.

17. The method of claim 16, wherein the public light-emitting element has a first aperture ratio, and the privacy light-emitting element has a second aperture ratio different from the first aperture ratio, and wherein the calculating of the privacy stress data is based on a stress index corresponding to the first aperture ratio and the second aperture ratio, and the public stress data corresponding to the public light-emitting element.

18. The method of claim 17, wherein the stress index is calculated based on a ratio of the first aperture ratio and the second aperture ratio.

19. The method of claim 18, wherein, when the first aperture ratio is greater than the second aperture ratio, the stress index has a value greater than "1".

20. The method of claim 16, further comprising:

calculating privacy stress data corresponding to the public light-emitting element based on public stress data corresponding to the public light-emitting element when the public light-emitting element emits light.

* * * * *